US011871061B1

(12) United States Patent
Lin et al.

(10) Patent No.: US 11,871,061 B1
(45) Date of Patent: Jan. 9, 2024

(54) AUTOMATED ADAPTIVE BITRATE ENCODING

(71) Applicant: Amazon Technologies, Inc., Seattle, WA (US)

(72) Inventors: Brandon Lin, Richmond (CA); Trevor Wells, Washougal, WA (US); Colin McCoy, Lake Oswego, OR (US); Max C Denton, Portland, OR (US); David Montgomery, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 178 days.

(21) Appl. No.: 17/219,703

(22) Filed: Mar. 31, 2021

(51) Int. Cl.
*H04N 21/2662* (2011.01)
*H04N 21/2343* (2011.01)
*H04N 21/236* (2011.01)
*H04N 21/643* (2011.01)

(52) U.S. Cl.
CPC ....... *H04N 21/2662* (2013.01); *H04N 21/236* (2013.01); *H04N 21/23439* (2013.01); *H04N 21/643* (2013.01)

(58) Field of Classification Search
CPC ......... H04N 21/2662; H04N 21/23439; H04N 21/236; H04N 21/643
See application file for complete search history.

(56) References Cited

U.S. PATENT DOCUMENTS

| | | | |
|---|---|---|---|
| 6,937,770 B1 * | 8/2005 | Oguz | H04N 19/132 |
| | | | 375/E7.176 |
| 8,683,066 B2 | 3/2014 | Hurst et al. | |
| 9,350,990 B2 | 5/2016 | Orton-Jay et al. | |
| 9,357,210 B2 | 5/2016 | Orton-Jay et al. | |
| 10,298,985 B2 | 5/2019 | Kalagi et al. | |
| 10,715,814 B2 | 7/2020 | Katsavounidis | |
| 10,742,708 B2 | 8/2020 | Katsavounidis | |
| 10,771,843 B2 | 9/2020 | Nair et al. | |
| 10,911,826 B1 * | 2/2021 | Regunathan | H04N 21/2662 |
| 10,979,733 B1 * | 4/2021 | Regunathan | H04N 19/182 |
| 2014/0241421 A1 * | 8/2014 | Orton-Jay | H04N 19/436 |
| | | | 375/240.03 |

(Continued)

FOREIGN PATENT DOCUMENTS

WO    WO-2014120960 A1 *    8/2014    ........... H04N 19/105

*Primary Examiner* — Robert J Hance
(74) *Attorney, Agent, or Firm* — S. Scott Foster; Kowert, Hood, Munyon, Rankin & Goetzel, P.C.

(57) ABSTRACT

Various embodiments of an automated adaptive bitrate ("ABR") encoding system and method that encodes an input video into a set of encoded video streams for ABR delivery, also known as an ABR ladder. The automated ABR encoding system encodes the input video into an initial number of speculative encodings, based on respectively determined resolution and quality level settings for the individual speculative encodings. It then estimates quality scores for a plurality of potential output encodings based on respective output statistics of the speculative encodings. It selects a plurality of better quality output encodings from the plurality of potential output encodings based on the quality scores. It then encodes the input video a second time into the plurality of better quality output encodings. The automated ABR encoding system selects one or more output encodings from the plurality of better quality output encodings to include in the ABR ladder.

20 Claims, 16 Drawing Sheets

(56) References Cited

U.S. PATENT DOCUMENTS

| | | | |
|---|---|---|---|
| 2014/0359678 A1* | 12/2014 | Shivadas | H04N 21/23439 |
| | | | 725/88 |
| 2015/0373328 A1 | 12/2015 | Yenneti et al. | |
| 2016/0277772 A1 | 9/2016 | Campbell et al. | |
| 2018/0160161 A1* | 6/2018 | Reznik | H04N 19/46 |
| 2018/0176285 A1 | 6/2018 | Asarikuniyil et al. | |
| 2018/0343458 A1 | 11/2018 | Katsavounidis et al. | |
| 2019/0028529 A1 | 1/2019 | Katsavounidis | |
| 2019/0297329 A1* | 9/2019 | Bampis | G06V 10/774 |
| 2019/0327510 A1 | 10/2019 | Kalagi et al. | |
| 2019/0355192 A1 | 11/2019 | Smith et al. | |
| 2020/0288187 A1 | 9/2020 | Katsavounidis | |
| 2021/0368182 A1* | 11/2021 | Pandit | H04N 19/102 |

\* cited by examiner

Encoding an input video into an initial number of speculative encodings, based on determined resolution and quality level settings for the individual speculative encodings.
1210

Encoding the input video into output encodings using at least one different setting determined from respective quality scores estimated for the output encodings based on output statistics of the speculative encodings.
1220

Selecting one or more output encodings from the output encodings to include in a set of encoded video streams for adaptive bitrate (ABR) delivery.
1230

FIG. 12

An automated ABR encoding system receives information associated with an input video to ABR encode into an set of encoded video streams for ABR delivery
1310

Determine an initial number of speculative encodings, and a resolution and a quality level setting for the speculative encodings.
1320

Cause the input video to be encoded by video encoders into the speculative encodings to produce output statistics about the speculative encodings.
1330

Determine, for individual renditions of the set of encoded video streams, resolution and quality level setting combinations, based on estimated quality scores for resolution and quality level setting combinations that were derived from an analysis of the output statistics.
1340

Cause, for individual renditions of the set of encoded video streams, the input video to be encoded, by the video encoders, into output video encodings based on the determined resolution and quality level setting combinations.
1350

Select, for individual renditions of the set of encoded video streams, an output video encoding from the output video encodings to use as the individual rendition in the set of encoded video streams for ABR delivery.
1360

FIG. 13

AUTOMATED ADAPTIVE BITRATE ENCODING

BACKGROUND

The most common over the top (OTT) distribution formats in use today are based on delivery of video using Adaptive Bit-rate ("ABR") technologies. Adaptive bit-rate video streaming technology was implemented to solve some of the challenges with streaming high bit-rate videos. Videos streamed using traditional formats such as progressive download and RTSP have a common challenge—any given video must be encoded at a specific target bit-rate (e.g., 500 kbps), and that is the bit-rate regardless of the access network over which it is delivered. If the chosen target bit-rate is too high, the video will not be delivered smoothly over lower-speed networks and there will be slow start times and re-buffering throughout the video. Even on fast networks like LTE 4G, slow start times and re-buffering will occur during times of congestion or high network utilization. If the chosen bit-rate is low, on the other hand, the video quality will be lower—thereby reducing the customer's quality of experience.

With Adaptive bit-rate, however, each ABR video is encoded at multiple bit-rates and resolutions. An ABR package contains a ladder of multiple renditions of the content encoded in a range of bit-rates and resolutions. An ABR ladder is multiple versions of the video source encoded at different resolutions and bit-rates for ABR delivery. Formats like HTTP Live Streaming (HLS) and Dynamic Adaptive Streaming over HTTP (DASH) define how to create a ladder with multiple renditions of the same video. Each is encoded at a different frame size or bit-rate, for delivery to web players, mobile devices, and smart TVs. Each player can dynamically choose the right rendition that meets its display configuration and currently available bandwidth. The goal is to play back content smoothly, switching between renditions as required.

However, problems have arisen in determining the number renditions that should be used. In addition, problems have also arisen in determining the right combination of bit-rates and resolutions for a particular piece of content. In many instances, the easy choice for ABR ladder is a fixed one where the same settings are used across a range of source content types. This results in a one-size-fits-all approach where the same ABR package layout and rendition encoding settings are re-used for every piece of video content that is processed after the initial configuration is performed. While easy to implement, the one size fits all approach results in inefficient use of origin storage and less than optimal video quality and bit usage of video content.

In reality, the ideal ABR package configuration varies widely depending on each source video because the visual complexity of each source affects how it can optimally be compressed. Having the time and resources to create a unique ladder per video has been a nearly impossible challenge to overcome. Even having the time and resources to create different versions of an ABR ladder for different categories of content, is an impossible challenge to overcome.

BRIEF DESCRIPTION OF THE DRAWINGS

Various embodiments in accordance with the present disclosure will be described with reference to the drawings, in which:

FIG. 12 is a flow diagram illustrating a method for generating a set of encoded video streams of an input video for ABR delivery, according to some embodiments.

FIG. 13 is a flow diagram illustrating a steps employed by an automated ABR encoding system generate a set of encoded video streams of an input video for ABR delivery, according to some embodiments.

Figure 1:
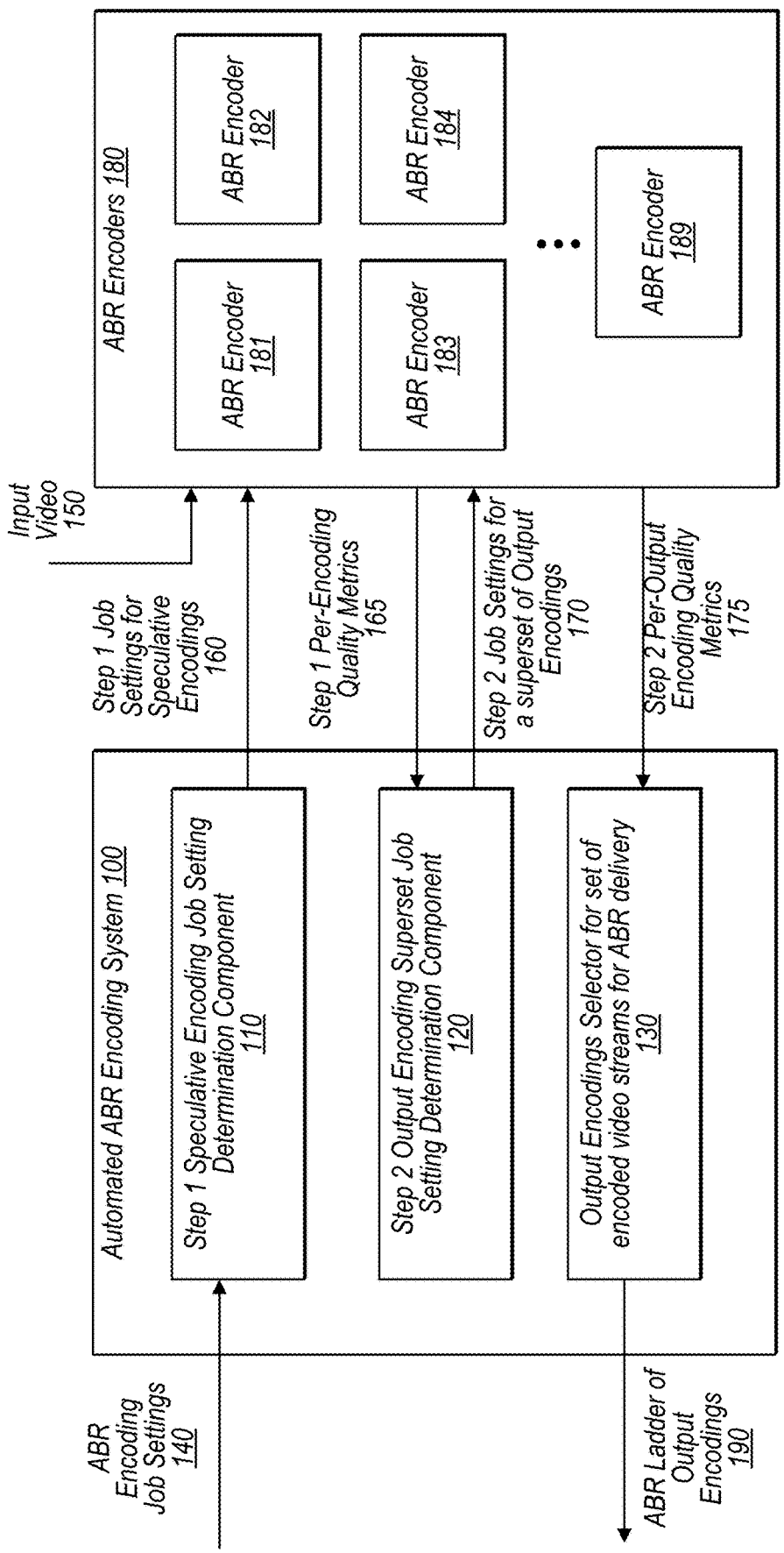
FIG. 1 is a diagram illustrating an environment for an automated ABR encoding system, where the automated ABR system receives settings for encoding an input video, provides job settings for speculative encodings, receives per-encoding quality metrics, provides job settings for output a superset of output encodings, receives per-output encoding quality metrics, and selects encodes video streams for ABR delivery, according to some embodiments.

In the following sections, reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments of apparatuses and methods for an automated adaptive bit-rate ("ABR") encoding system are described herein. Automated ABR encoding creates a unique ABR ladder for each video source, in some embodiments. The creation of the ABR ladder is based on the complexity of the content from an analysis performed during the encode process, in some of these embodiments. This analysis step can pick the ideal renditions for the ABR configuration of each video. Automated ABR can use a hybrid approach between multi-pass encoding and traditional per-title encoding, in some embodiments. Automated ABR can increase efficiency, decrease costs, and increase quality by having second step encodings of an input video be substantially different than first pass encodings, in terms of resolution, quality level, bitrate, and/or number of encodings performed, in some of these embodiments. Automated ABR encoding is designed to create the best video quality with the lowest bit-rate, in some embodiments. In addition, Automated ABR encoding optimizes the output ABR ladder by eliminating redundant or overlapping renditions, in some embodiments. Automated ABR has the ability to handle diversity and complexity while maximizing efficiency. In addition, Automated ABR makes it dramatically simpler for a user to encode an input video into an ABR ladder by automatically choosing many of the ABR settings that previously would have to have been determined manually. The goal is to find the ideal resolution for each rendition, which often means using a lower bit-rate, and/or a lower resolution, and/or a fewer number of renditions, than a fixed ladder would have used, in some embodiments, while at the same time preserving the viewing experience. The result is not only a simpler user experience, but also a cost savings with overall package size and origin storage costs reduced by up to 40% when compared to a fixed ABR ladder, in some embodiments. This is a significant advantage for, for example, streaming providers with large libraries of long-tail, or lower viewership, content.

To achieve the optimal video encoding performance, the target quality level, bit-rate, and resolution need to be customized for each unique piece of content. If the target quality level is set too low relative to the target bit-rate, the bandwidth is under-utilized and the video quality is suboptimal. If the target quality level is set too high relative to the target bit-rate, rate control from time to time reduces the quality to meet the target bit-rate, which results in unstable video quality. On the other hand, if the target bit-rate is set too high, money is being wasted on higher CDNs and storage costs. Instead, for a given target bit-rate, the optimal resolution of a renditions differs depending on the complexity of the content. Therefore, for the best ABR video encoding results, the users need to tailor the ABR configuration and the settings of each rendition for each unique piece of content. From the user perspective, it is a very challenging task to get the ABR encoding setting right for one piece of content, let alone for all types of video content that their platform may process.

In addition, streamers' data transmission costs for ABR delivery, for example, typically significantly outweigh encoding costs, so there is financial incentive to get the best possible quality per transmitted bit. The optimal settings to achieve this vary with each piece of input content, however, so a static ABR ladder does not work well for many use cases. Customers are typically not independently able to optimize ABR settings for each piece of content. They want a system that does this for them automatically. The Automated ABR Encoding feature relieves the users from such a task and performs the ABR package layout and encoder setting decisions automatically for each unique piece of content.

The Automated ABR Encoding feature utilizes a three-step approach, in some embodiments. The first step performs speculative encoding, the second step creates a refined set of candidate video outputs, and the third step chooses which final outputs to include in the ABR package. This approach uses multi-pass encoding, but even more than using multi-pass encodings, has ability to alter the configuration settings between passes while still preserving statistical intelligence determined during the initial pass. Instead of having the same set of user settings (such as quality level, bit-rate, and resolution) being attempted twice for each rendition independently, in some embodiments of the automated ABR encoding system, the outputs from all the encodings of the first step are analyzed holistically. After the outputs from all encodings of the first step are analyzed holistically, the system can determine the settings for each rendition of the final encodings in the second step, in some embodiments. In the first step, therefore, all (or at least some of) the resolution candidates can be speculated to produce the output statistics for each (or at least some of the) potential resolution, in some embodiments. During the analysis of each (or at least some) rendition, the Automated ABR encoding system can estimate the quality score and output bit-rate for different resolutions and quality level settings, in some of these embodiments. By comparing the bit-rates and the quality scores, the Automated ABR encoding system can determine the best encoder settings and resolution for individual renditions. In addition, more than one encoded bitstream can be encoded in the second step in case the analysis estimates are off, in some embodiments. As part of a third step, a final selection process can review the analytics generated by the encoders in the second step and can determine which candidate will be use to fulfill each rendition of the output ABR ladder.

Embodiment for Automated ABR Encoding

FIG. 1 is a diagram illustrating an environment for an automated ABR encoding system, according to some embodiments. The automated ABR system 100 receives ABR job settings 140 for encoding an input video from a client or other entity. A step 1 speculative encoding job setting determination component 110 analyses the received ABR job settings 140 and provides the step 1 job settings for speculative encodings 160 to a plurality of ABR encoders 180. The ABR encoders encode the input video 150 into encoders into the speculative encodings to produce output statistics for the individual speculative encodings. A step 2 output encoding superset job setting determination component 120 receives per-encoding quality metrics 165 back from the ABR encoders 180, and determines, for individual renditions, one or more different resolution and quality level setting combinations, based at least in part on estimated quality scores for a plurality of resolution and quality level setting combinations that were derived from an analysis of the output statistics, in some embodiments. The step 2 output encoding superset job setting determination component 120 then provides job settings for a superset of output encodings 170 to the ABR encoders 180. The ABR encoders encode the input video into one or more output video encodings based at least in part on the one or more determined different resolution and quality level setting combinations. An output encodings selector for a set of encoded video streams for ABR delivery 130 receives step 2 per-output encoding quality metrics 175 back from the ABR encoders, and selects encoded video streams for ABR delivery in an ABR ladder of output encodings 190.

Automated ABR Encoding Workflow

Figure 2:
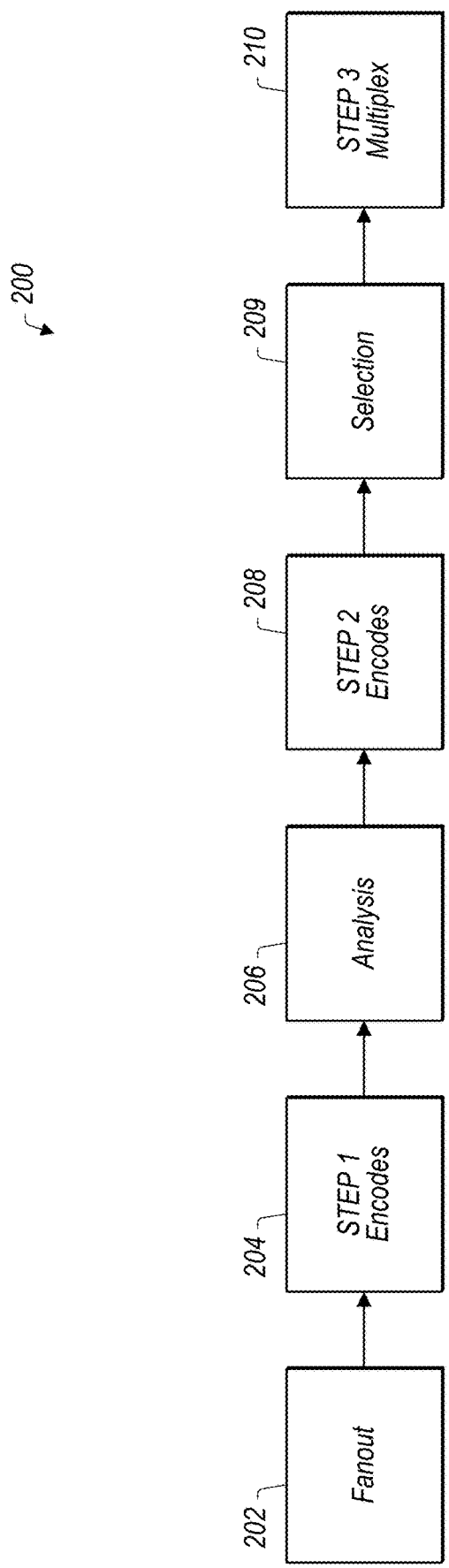
FIG. 2 is a diagram illustrating a workflow overview for automated ABR encoding, according to some embodiments.

FIG. 2 is a diagram illustrating a workflow overview for automated ABR encoding, according to some embodiments. The Automated ABR Encoding utilizes a three-step approach, in some embodiments. The first step performs speculative encoding and the second step performs the final encoding, in some embodiments. A third step can choose which final outputs to include in the ABR package. In other embodiments, the selection of the final outputs is not considered to be a step or is not performed or implemented, and so the automated ABR encoding system can be said to use a two-step approach. The Automated ABR encoding system runs in the Fanout 202, Analysis 206, and Selection 209 blocks, in some embodiments. The Automated ABR encoding system orchestrates the step 1 (204) and step 2 (208) encodes including the number of encodes performed, their settings, and resolutions, in some of these embodiments. In addition, the Automated ABR encoding system can also orchestrate the step 3 multiplex 210. Each stage in the automated ABR encoding workflow can be stateless, in some embodiments.

In contrast to the traditional two-pass encoding where the same set of user settings (i.e., quality level, bit-rate, and resolution) is being attempted twice for each rendition, the outputs from all the encodings of the first step 204 can be analyzed holistically 206 to determine the settings for each rendition of the final encodings in the second step 208, in some embodiments. In the first step 204, all (or at least some of) the resolution candidates are speculated to produce the output statistics for each (or at least some) potential resolution, in some of these embodiments. During the analysis 206 of each rendition, the Automated ABR encoding system estimates the quality score and output bit-rate for different resolutions and quality level settings, in some embodiments. By comparing the bit-rate and the quality scores, the Automated ABR encoding system determines the best encoder settings and resolution for each rendition, or at least some of the renditions, in some embodiments.

The FANOUT stage 202 determines the initial number of renditions for the ladder and the target bit-rate for each of those renditions, in some embodiments. It also determines the resolution and encoder settings for the step 1 encodes, in some of these embodiments. In the Fanout stage 202, prior to learning about the source video content, the Automated ABR encoding system can determine the initial number of renditions based on the ratio between the minimum and maximum resolutions and the ratio between the minimum and maximum bit-rates, in some embodiments. The Automated ABR encoding system can find the maximum number of renditions for which the step ratios are lower than the maximum step ratio thresholds, in some of these embodiments. The step ratio can be thought of as the ratio between the adjacent lower rendition and the current rendition. The lower the step ratio, for example, the larger the gap is between adjacent renditions. A maximum step ratio threshold might also be required to ensure there is enough delta, in terms of bit-rate or resolution, between the adjacent renditions.

TABLE 1

Examples of numbers of renditions of different resolutions and bit-rates

| Max Resolution | 1280 × 720 | 1920 × 1080 | 1920 × 1080 | 3840 × 2160 |
|---|---|---|---|---|
| Max Bit-rate | 3,000,000 | 5,000,000 | 6,500,000 | 8,000,000 |
| Min Bit-rate | 700,000 | 700,000 | 700,000 | 700,000 |
| # of Renditions | 4 | 5 | 6 | 8 |

Next, the Automated ABR encoding system can determine the number of step 1 encodes to perform and their encoder settings, in some embodiments. The number of step 1 encodes can be determined based on the initial number of renditions. It can be, for example, 2 or 3 more than the initial number of renditions. In some embodiments, step 1 encodes all the resolutions that can potentially appear in the output ABR ladder. In some embodiments the Fanout stage 202 might determine one or more of the resolution, the quality level, the maximum bit-rate, and/or the buffer size for the step 1 encodes. In some embodiments, the Fanout stage 202 might determine these parameters for each of the step 1 encodes.

The objective of the Step 1 Encodes stage 204 is to perform speculative encode to learn more about the source video content, in some embodiments. A statistics file can be generated for each step 1 encode to gather information. In some of these embodiments, all the output stats files from all step 1 encodes are fed back into the Analysis stage 206 of the Automated ABR encoding system. The statistics files can contain, for example, one or more quantization parameters, and bits information for individual quality levels.

For a given target bit-rate, the optimal resolution of a rendition differs depending on the complexity of the content. In addition, the goal of the automated ABR encoding system is to find the sweet spot of quality level for the given content. Therefore, the objective of the ANALYSIS stage 206 is to find the optimal settings for resolution and quality level for each rendition given the video content and the target bit-rate.

Figure 3:
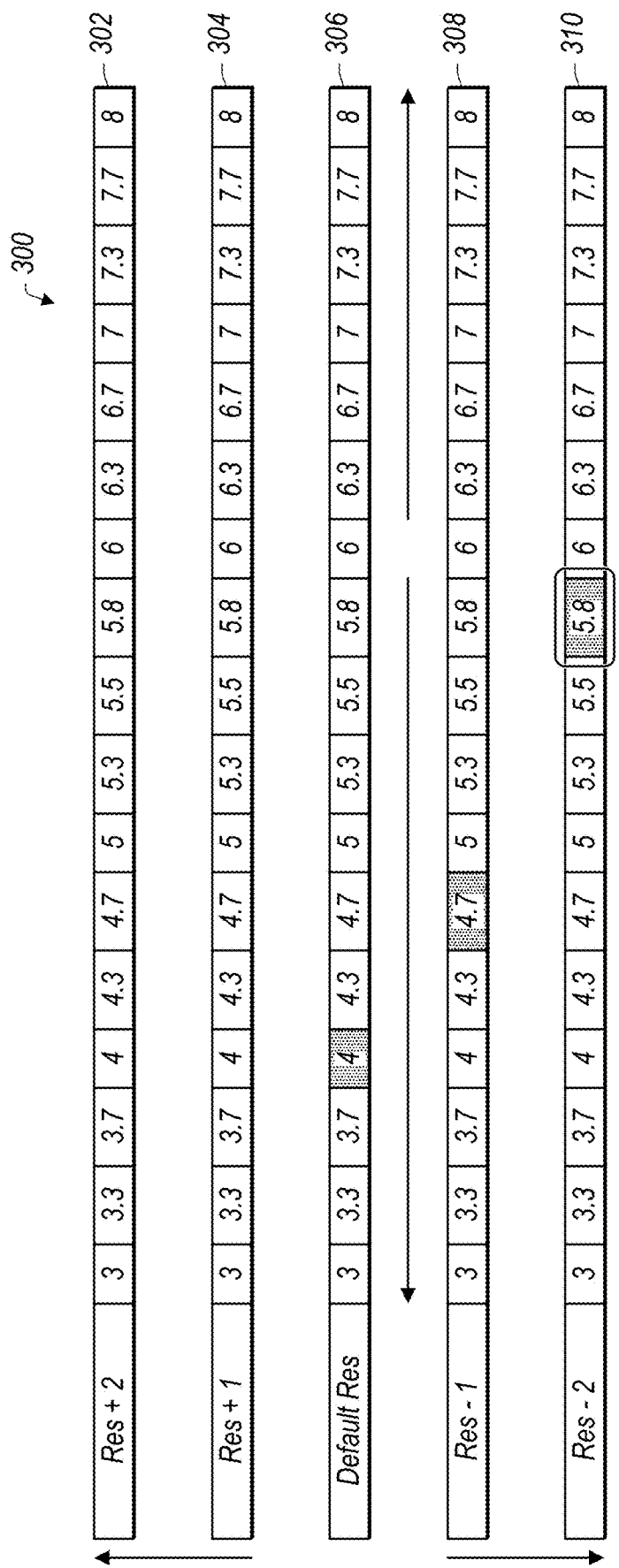
FIG. 3 is a diagram illustrating a two dimensional search of target quality level and resolution in an Analysis stage of an automated ABR encoding workflow, according to some embodiments.

FIG. 3 is a diagram illustrating a two dimensional search of target quality level and resolution in an Analysis stage 206 of an automated ABR encoding workflow, according to some embodiments. As shown in FIG. 3, the Analysis stage 206 performs a 2D search 300 of target quality level and resolution for each rendition. FIG. 3 depicts the different resolutions as different rows (302, 304, 306, 308, 310) in the two dimensional search structure, and the quality level setting as the cells within the rows. The search algorithm searches for the point (i.e. the target quality level and resolution combination) with the highest (or at least with a better or higher) Quality Score. Based on the optimal combination of the resolution and target quality level found, it assigns step 2 encodes for the better or superior combinations found for individual renditions, in some embodiments. In some of these embodiments, it assigns two step 2 encodes for the top two combinations found for each rendition. In some embodiments the Analysis stage 206 might determine one or more of the resolution, the quality level, the maximum bit-rate, and/or the buffer size for the step 2 encodes. In some embodiments, the Analysis stage 202 might determine these parameters for each of the step 2 encodes.

As shown in FIG. 3, the Analysis stage 206 has found that the point with the highest quality score is at a resolution of "Res–2" 310 with a quality level setting of 5.8. The Analysis stage has also found that the resolution of "Res–1" 308 with a quality level of 4.7, and the "Default Res" 306 with a quality level of 4 also provides superior quality scores. The Analysis stage 206 can determine the top two resolution and quality level combinations and assign step 2 encodes to these top two combinations, in the embodiment shown in FIG. 3. The Analysis stage 206 might also take into account the estimated bit rate of a target quality level and resolution combination to determine if the estimated bit rate is less than or equal to the target bit rate for the rendition being determined. If the estimated bit rate is greater, then the Analysis stage 206 might discard that target quality level and resolution combination from step 2, in some embodiments. In other embodiments, the Analysis stage 206 might discard combinations that have greater than a threshold difference between estimated bit-rate and the target bit-rate of the rendition, or it might use the difference between estimated bit-rate and the target bit-rate of the rendition as another factor in determining the top target quality level and resolution combinations for the rendition, depending on the embodiment.

The objective of the STEP 2 Encodes 208 is to encode the final bitstreams for the ABR ladder, in some embodiments. In some embodiments, there can be two bitstreams encoded for each rendition for the top two encoder settings and resolution combination. In other embodiments, there can be greater or fewer bitstreams encoded for each rendition. A stats file can also be generated for each step 2 encode to gather information. In addition, all (or at least some of) the output stats files from all step 2 encodes can be fed back into the Selection stage 209 of the Automated ABR workflow. The statistics files can contain, for example, one or more quantization parameters and bits information for individual quality levels.

The objective of the SELECTION stage 209 is to select the encoding or bitstreams for the final ABR ladder. In some embodiments, the Selection stage 209 first selects the final bitstream out of the two step 2 encoded bitstreams based on a Quality Score, and/or how far off the bit-rate is from the target bit-rate of the rendition. In other embodiments the Selection stage 209 selects the final bitstream out of the greater than 2 number of step 2 encoded bitstreams based on a Quality Score, and/or how far off the bit-rate is from the target bit-rate of the rendition. In embodiments where the step 2 encode has only encoded one bitstream for any given rendition, the Selection stage 209, if used, will choose that one bitstream, in some embodiments, or the Selection stage 209 might be skipped and/or not used and/or not implemented in others of these embodiments. Next unnecessary renditions can be eliminated, for example, in the case of a Quality Score too high, or a bit-rate too close to the neighboring rendition.

The final Step 3 Multiplex 210 stage receives information from the Selection stage and produces the final ABR ladder, in some embodiments. The Selection stage 209 can send job settings to the Multiplex stage 210. The purpose of the Multiplex stage 210 can be to multiplex the selected bitstream into the final outputs for individual renditions, in some embodiments. In embodiments where there are two encoded bitstreams for a rendition, the Multiplex stage 210 can multiplex and/or choose one of those two. This can be based on the information from the Selection stage 209 in some embodiments. In embodiments where there are more than two encoded bitstreams, the Multiplex stage can multiplex and/or choose one of those more than two. In embodiments, where the step 2 Encode 208 has only encoded one bitstream for any given rendition, the Multiplex stage 210, if used, can multiplex and/or choose that one bitstream, in some embodiments, or the Multiplex stage 210 might be skipped and/or not used and/or not implemented in others of these embodiments. The Multiplex stage 210 can deliver the final outputs for the requesting client, in some embodiments. In some of these embodiments, the individual renditions of the outputted ABR ladder will include or be pointed at an existing encoded stream from the Step 2 Encodes.

Figure 4:
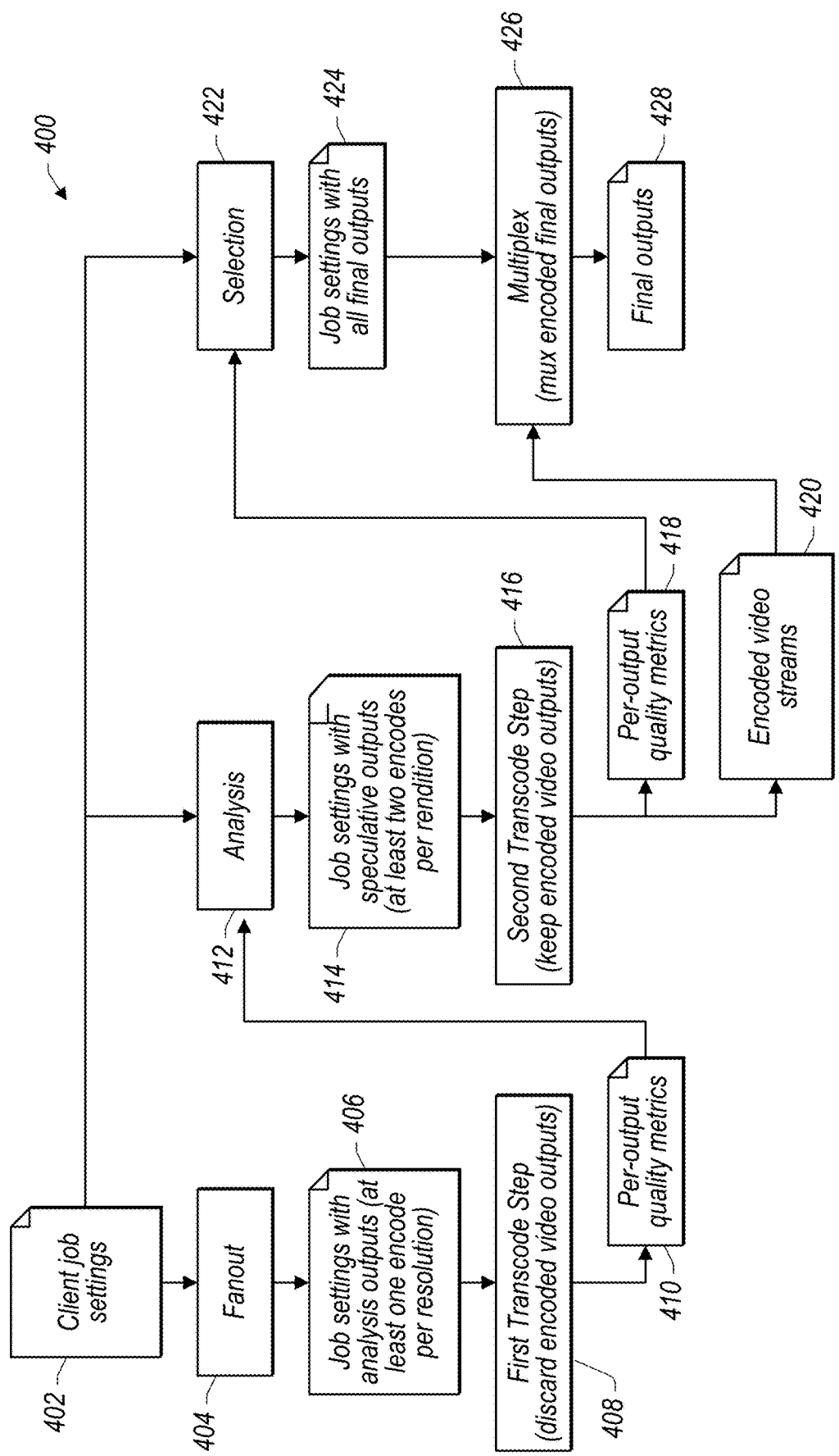
FIG. 4 is a diagram illustrating a more detailed workflow for automated ABR encoding, according to some embodiments.

FIG. 4 is a diagram illustrating a more detailed workflow for automated ABR encoding, according to some embodiments. FIG. 4 will be explained without repeating some of the detail that was discussed with regard to FIG. 2, however the detail for the corresponding stage of FIG. 2 can also apply to the description of FIG. 4, in some embodiments. First in FIG. 4, customer job settings 402 for an ABR encode are obtained by the Fanout 404 phase. The purpose of the Fanout phase 404, in some embodiments, is to produce a group of video output settings 406 which, once encoded and measured, will best allow the automated ABR encoder to predict the best final set of output encodes. In some embodiments, that group can consist of the original stack of determined resolutions, plus two lower-resolution outputs.

The Fanout 404 provides job settings with analysis outputs 406 to the First transcode step 408. The purpose of the first transcode step 408 is to run the fanned-out output set and gather metrics for analysis, in some embodiments. The first transcode step 408 can provide per-output quality metrics to the Analysis phase 412. The purpose of the Analysis phase 412 is to analyze the quality scores from the previous transcode and predict the best set of encoder configurations for the speculative outputs, in some embodiments. The analysis phase 412 can obtain analysis files from the first step, along with the original settings for context. The analysis phase 412 can return another superset of video encode settings 414 for the next transcode step.

The purpose of the second-step transcode step 416 is to run the superset of final output encodes and gather analysis data, in some embodiments. This allows the automated ABR encoder to select the appropriate outputs in a later step, then multipliex and/or remultiplex those to the final outputs. The other outputs can be discarded, in some embodiments. The second transcode step 416 then send the per-output quality metrics 418 to the selection phase 422. It can also send the encoded video streams, or an indication of the encoded video streams, to the multiplex 426 phase. The purpose of the output selection phase 422 is to select the final encoded output from those encoded in the previous phase. The selection phase 422 sends job settings with all final outputs 424 to the multiplex phase 426. The purpose of the multiplex phase 426 is to multiplex the selected video elementary streams and encode audio/captions into the final outputs, in some embodiments. The multiplex phase 426 delivers the final outputs 428 for the requesting client, in some embodiments. In some of these embodiments, each video output will now be pointed at an existing encoded stream from the second-step transcode.

Quality Score ("QS")

Traditionally, to objectively evaluate two encoded video bitstreams, an objective video quality metric such as peak signal-to-noise ratio ("PSNR"), structural similarity index measure ("SSIM"), or Video Multi-method Assessment Fusion ("VMAF") is used. The drawback of these objective metrics includes their inability to reflect the subjective video quality (i.e., PSNR) and costly computation (i.e., VMAF). Moreover, none of the metrics can provide a universal perceptual video quality score across different types of the content. Previous studies have showed that even VMAF was not very effective in this regard. Therefore, some embodiments of the Automated ABR Encoding system can use an improved and novel video quality measure for various decisions. Of course, the Automated ABR encoding system can use any type of measurement for video quality, including but not limited to PSNR, SSIM, or VMAF, but to achieve better results an improved video quality measure is introduced. Below is a list of criteria for the video quality ("VQ") metric for Automated ABR Encoding:

TABLE 2

List of criteria for the video quality metric for Automated ABR Encoding

| Use Case | Description | Expectation | VQ Metrics |
|---|---|---|---|
| 1 | Compare encoded bitstreams for the same source video content at the same resolution | Higher score means better perceptual VQ | VMAF PSNR and SSIM to some extent |
| 2 | Compare encoded bitstreams for different source video content | Higher score means better perceptual VQ | None VMAF not doing well and SSIM is even worse |
| 3 | Compare bitstreams encoded at different resolutions of the same source video content | Higher score means better perceptual VQ | VMAF is highly dependent on the reference resolution. If using the original resolution as reference, all lower resolutions are over-penalized and do not align with subjective VQ |

The improved Quality Score determination, as explained below, can be to fill this gap, in some embodiments. The improved Quality Score is designed to support all three aforementioned use cases for bitstreams, whereas previous video quality metrics fall short in one or more of the use cases. In ABR Encoding, the target quality level can be one of the main encoder settings to control the output video quality. However, due to other constraints such as the maximum bit-rate and buffer size, the target quality level can sometimes have minimal relation to or effect on the actual video quality of the encoded video bitstreams. However, in applications such as Automated ABR Encoding where a pair of encoded video bitstreams are evaluated and ranked, the Quality Score ("QS") serves as a good indicator of the quality of the output video bitstreams. It can share the same scale as variable bit rate ("VBR") quality level and is also a floating point number between 1 and 10.

The difference between QS and target quality level ("QL") is that the target QL is the target quality level an encoding asset or a frame is assigned with. The QS is the resulting quality level an encoding asset or a frame is encoded with. In some embodiments, QS is always less than or equal to target QL. QS is lower than target QL whenever a frame cannot be encoded at the target QL due to maximum bit-rate or buffer size constraint. In ABR Encoding, the target quality level ("$QL_{Target}$") together with the content characterization ("CC") determines the target Quantization Parameter ("QP") of each picture. For each given content, the target QP of frame i from QL can be characterized as:

$$QP_{Target}(i) = f(QL_{Target}, CC(i), RCContext(i))$$

RCContext(i) refers to the impact of the recent historical scenes' complexity to the rate control for frame i. It can also be referred to as the recency effect or the short-term memory effect. After encoding, by working backward from the actual QP used and the type of content, the resulting quality level can be obtained for each picture. For a given video frame, QP is the only independent variable that affects the output bit-rate and video quality ("VQ") within the Automated ABR Encoding system. Therefore, QS of a frame can be determined based on the QP, CC, and the RCContext. Once a QP of a frame is determined or estimated, we can work backward to determine its QS:

$$QS(i) = f^{-1}(QP_{Actual}(i), QL_{Target}, CC(i), RCContext(i))$$

The QS can be a weighted aggregate of the resulting quality level of each picture for the entire video bitstream, in some embodiments. To determine the collective score for an asset, the following formula can be used:

$$QS_{seq} = \frac{\sum_{i=0}^{n} W_{PicType}(i) \cdot W_{Cpix} \cdot W_{QLD}(i) \cdot QS(i)}{\sum_{i=0}^{n} W_{PicType}(i) \cdot W_{Cpix}(i) \cdot W_{QLD}(i)}$$

In the formula above, the QS is for a sequence of n frames ("$QS_{seq}$"). In addition, $W_{PicType}$ is the weighting based on the picture type, $W_{Cpix}$ is the weighting based on the intra/inter complexity of the frame, and $W_{QLD}$ is the weighting based on the QL drop of the frame in respect of the target QL.

Heterogeneous Resolution QS

In order to make decision across resolutions, the QS can reflect the perceptual quality drop due to reduction in resolution of the asset, in some embodiments. This can be a challenging problem because it can also depend on the viewing devices. Two weighting mechanisms can be used. One embodiment can be based on a weighted average of the two weighted QS:

$$QS_{ResWeighted1} = QS_{Raw} \cdot \left(\frac{Res}{Full\ Res}\right)^{ResScaleExp}$$

$$QS_{ResWeighted2} = QS_{Raw} - ResOffsetExp \cdot \ln\left(\frac{Res}{Full\ Res}\right)$$

Computational cost wise, the QS metric can be computed during the encoding or encoding simulation of a video, so the computational overhead is negligible. Performance wise, the metric can be trained and can be shown to correlate well with the subjective video quality, in some embodiments. Not only can it rank the video quality for the same source content, it can also be used to measure and compare the perceptual video quality between different contents, in some of these embodiments.

Accurate Bit Prediction

Bit prediction can be an important and fundamental part of the rate control for maintaining stable video quality while fulfilling the bit-rate and buffer constraints, in some embodiments. In some embodiments of the Automated ABR Encoding, the target bit-rate for each rendition, or for individual renditions, can be calculated as:

$$Target\ Bitrate = Max\ Bitrate \left(\frac{Min\ Bitrate}{Max\ Bitrate}\right)^{\frac{Rendition\ ID}{NumRenditions-1}}$$

It can be important to have the actual bit-rate as close as possible to the target bit-rate in order to have: no overshoot of max bit-rate; and evenly spaced rendition bit-rates (exponentially), in some embodiments. Two things can be done to achieve better control of the output bit-rate: more accurate bit prediction scene-based Coded Ratio ("CR"); and updated per-title decision tree to minimize actual-to-target bit-rate errors, in some embodiments.

Improved Scene-Based Coded Ratio Bit Prediction

Bit prediction can have two main components, in some embodiments: (1) PA Picture Bits Estimation—It predicts the size of a picture based on the pre-analysis stats only; and (2) Feedback Correction: Correct the bit prediction based on the history of encoded picture sizes. The feedback correction can be particularly important for the two-step approach in Automated ABR Encoding because every picture might be encoded once for each resolution in step 1 encode. The prediction correction data can be available for every picture in step 2 encode, in some of these embodiments. Therefore, it can be important to have an effective feedback correction, in some embodiments. An improved feedback correction Scene-based CR v2, building on top of Coded Ratio ("CR") Tree, can be implemented for Automated ABR Encoding, in some embodiments.

The bit prediction model of the CR Tree can be based on three features of QP, picture type, and context bin, in some embodiments. However, the CR Tree can have some limitations, in some of these embodiments. First, the context bin might be a single dimension 8-bit scalar. For a long running encoder, there might be something in the history with very close context bin but drastically different characteristics leading to drastically different CR, in some embodiments. Moreover, QP difference and context bin difference checks can be threshold-based, in some embodiments. A small difference in QP or context bin might result in a different model and lead to a significantly different bit prediction result.

Figure 5:
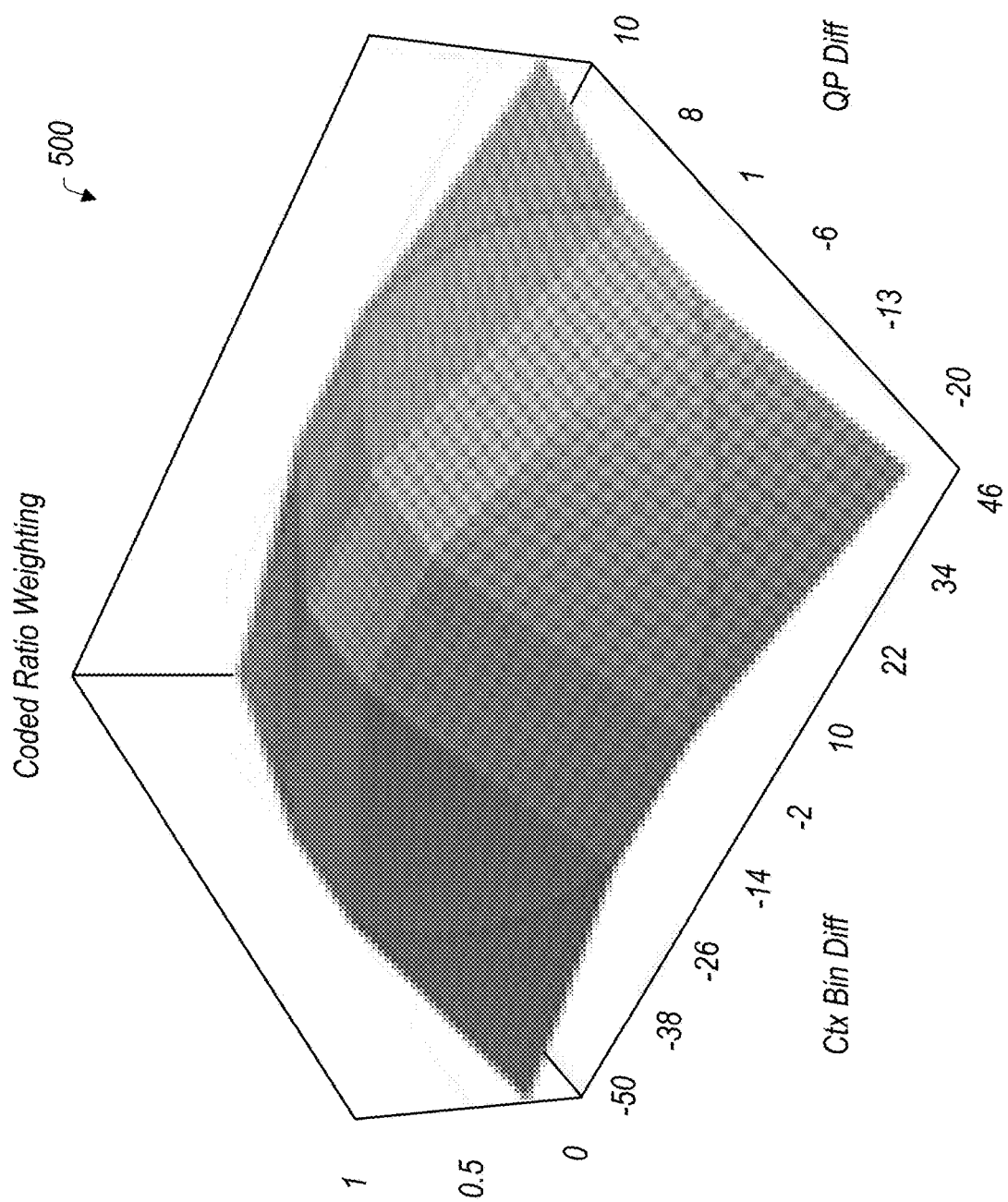
FIG. 5 is a diagram illustrating an example scene-based coded ratio model weighting, using improved scene-based coded ratio bit prediction according to some embodiments.

The Scene-based CR adds scene ID as an additional feature to a CR Tree, in some embodiments, to apply the bit prediction model within the same scene. It can also relax the criteria for applying CR models by applying a weight to smoothen the transitions between models, in some of these embodiments. The weighting of a model can be based on QP difference and the context bin difference, which can be illustrated in FIG. 5. FIG. 5 is a diagram 500 illustrating an example scene-based coded ratio model weighting, using improved scene-based coded ratio bit prediction according to some embodiments. The larger the difference in context bin and QP, the lower the weighting of the model, in some embodiments. The Scene-based CR can further add a few parameters to the weighting of a model: temporal distance, and estimated PA picture bits ratio, in some of these embodiments.

Automated ABR Decision Tree to Minimize Bit-Rate Error

Figure 6:
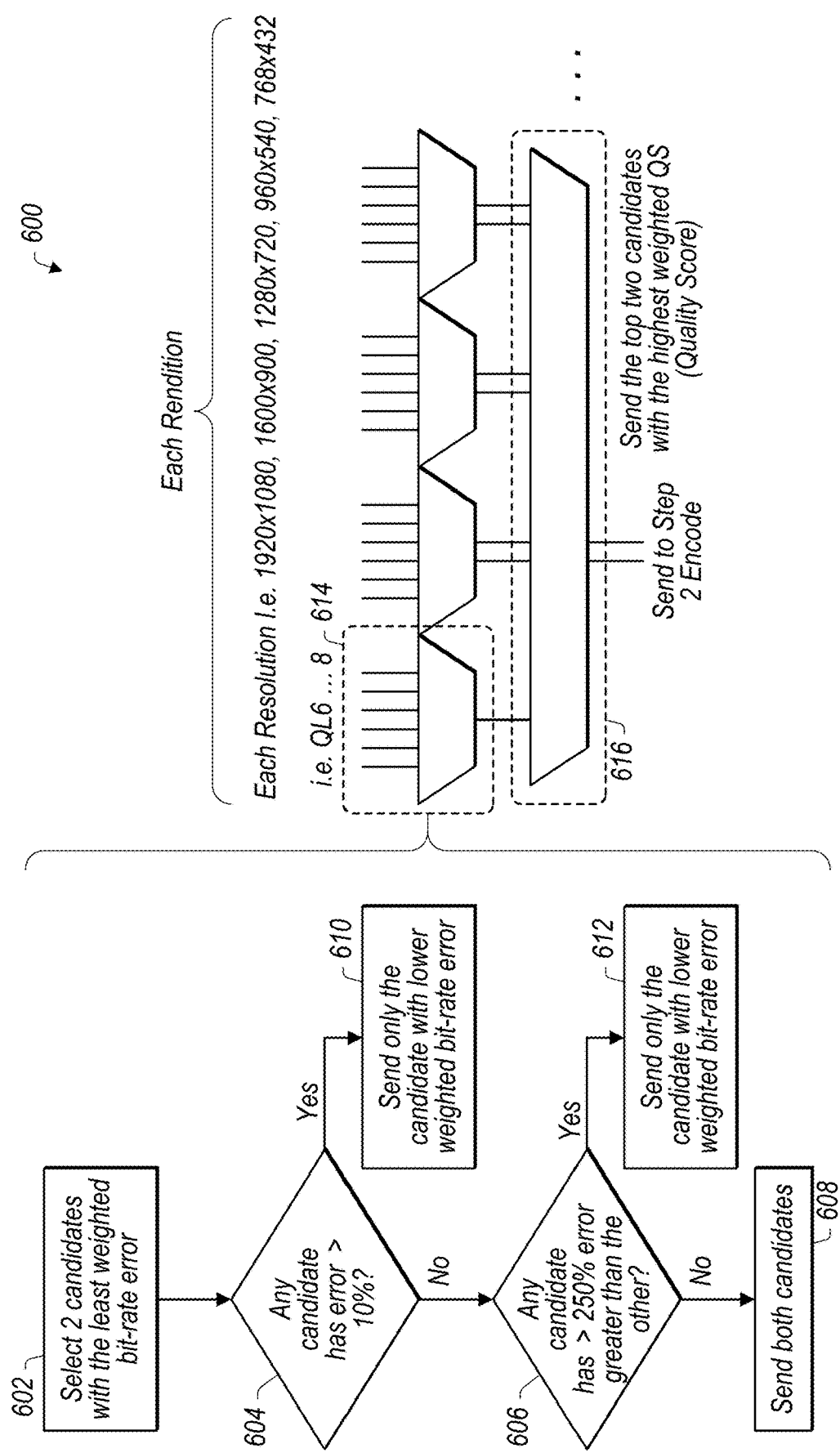
FIG. 6 is a diagram illustrating an analysis stage decision tree, of an automated ABR decision tree to minimize bit-rate error, according to some embodiments.

FIG. 6 is a diagram illustrating an analysis stage decision tree, of an automated ABR decision tree to minimize bit-rate error, according to some embodiments. To avoid having an individual rendition's bit-rate deviating from the target, additional checks can be been added to both the Analysis 206 and Selection 209 stages of the Automated ABR Encoding system, in some embodiments. In the Analysis stage, the bit-rate error can be taken into account when selecting the final encode candidates, as shown in FIG. 6. The Analysis stage 600, illustrated in FIG. 6, can analyze all (or at least some of) the quality levels 614 of each (or at least some of the) resolution, in some embodiments. It can do this for each (or at least some of the) rendition the ABR ladder. The Analysis stage involves determining 616, for individual renditions in the ABR ladder, the candidates with better weighted QS to send to step 2 encode. In some embodiments, the Analysis stage determines 616 the top two candidates with the highest weighted QS to send the step 2 encode.

The flowchart in FIG. 6 begins at block 602 which selects two candidates with the least weighted bit-rate error. It then transitions to block 604 which determines whether any candidate has a bit-rate error >10%. If a candidate does have a bit-rate error >10% then the flowchart transitions to block 610 which sends only the candidate with lower weighted bit-rate error. If a candidate does not have an error rate >10%, then the flowchart transitions to block 606 which determines whether any candidate has >250% bit-rate error greater than the other candidate. If the answer to block 606 is yes then the flowchart transitions to block 612 which sends only the candidate with the lower weighted bit-rate error to step 2 encode. If the answer to block 606 is no then the flowchart transitions to block 608 which sends both candidates.

Figure 7:
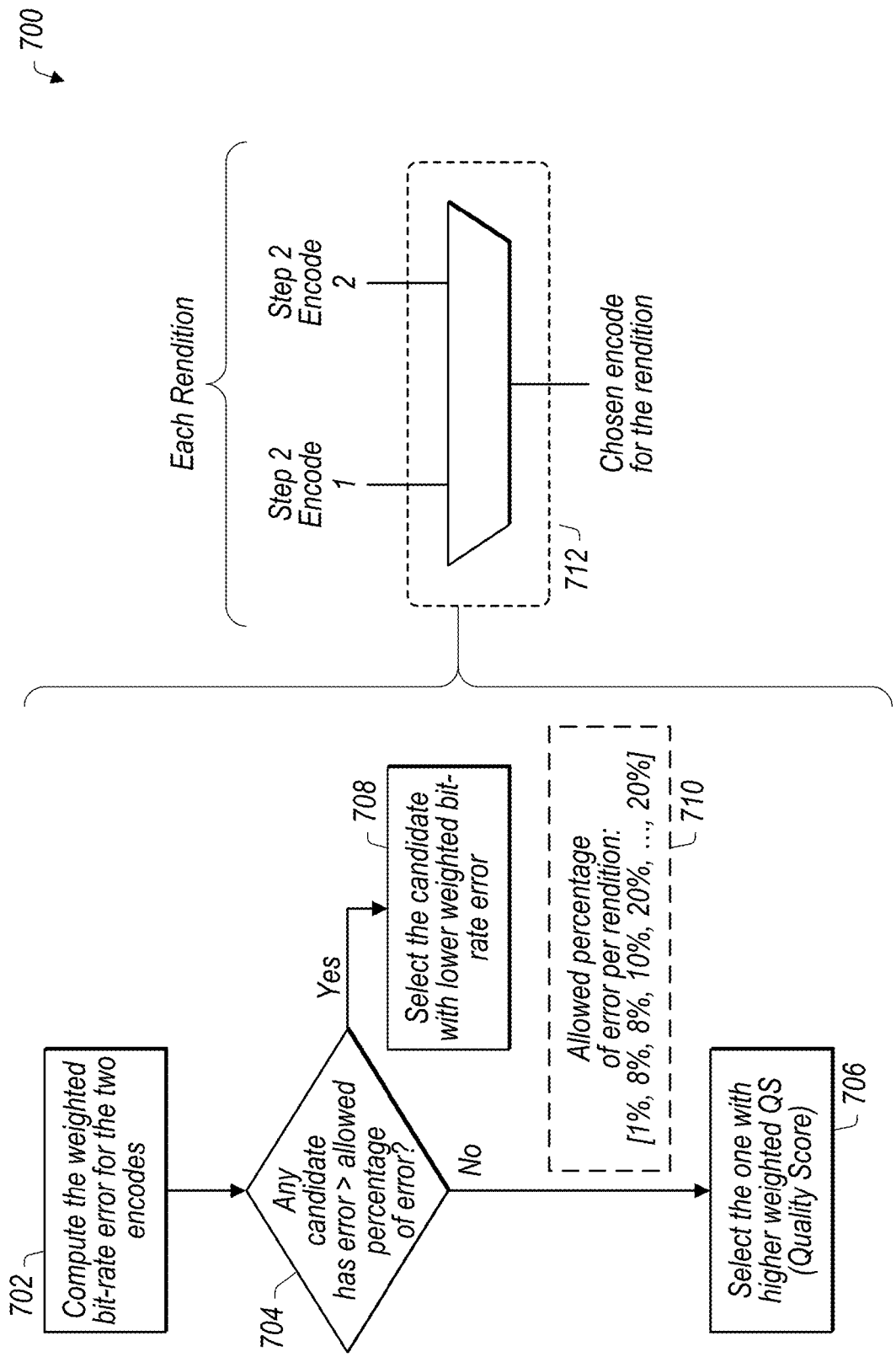
FIG. 7 is a selection stage decision tree, of an automated ABR decision tree to minimize bit-rate error, according to some embodiments

FIG. 7 is a Selection Stage decision tree, of an automated ABR decision tree to minimize bit-rate error, according to some embodiments. In the Selection stage, the Automated ABR encoding system also tries to avoid bitstream candidates with high bit-rate error, as shown in FIG. 7. The selection stage, as illustrated in FIG. 7, involves choosing 712, for individual and/or each rendition in the ABR ladder, an encode from either the step 2 encode choices. The flowchart in FIG. 7 begins at block 702 which computes the weighted bit-rate error for the two encodes. It then transitions to block 704 which determines whether any candidate has bit-rate error greater than an allowed percentage of error. If the result of block 704 is yes, the flowchart transitions to block 708 which selects the candidate with lower weighted bit-rate error. If the result of block 704 is negative, the flowchart transitions to block 706 which selects the one with higher weighted Quality Score ("QS").

Resolution Table Generation

The Automated ABR encoding system can prepare a resolution table including all the resolutions that the output ABR ladder can potentially use, in some embodiments. The term resolution can refer to, in some embodiments, not only the commonly perceived spatial resolution of the video but also the temporal resolution, which is commonly known as the frame rate. To produce a resolution table for an ABR ladder, the automated ABR encoding system can start with an internal resolution table template, in some embodiments. The makeup of the table template ensures, in some of these embodiments, that all the common and standard ABR resolutions are included all the way from 8K to 204$p$ with evenly spaced resolutions in between.

Figure 8:
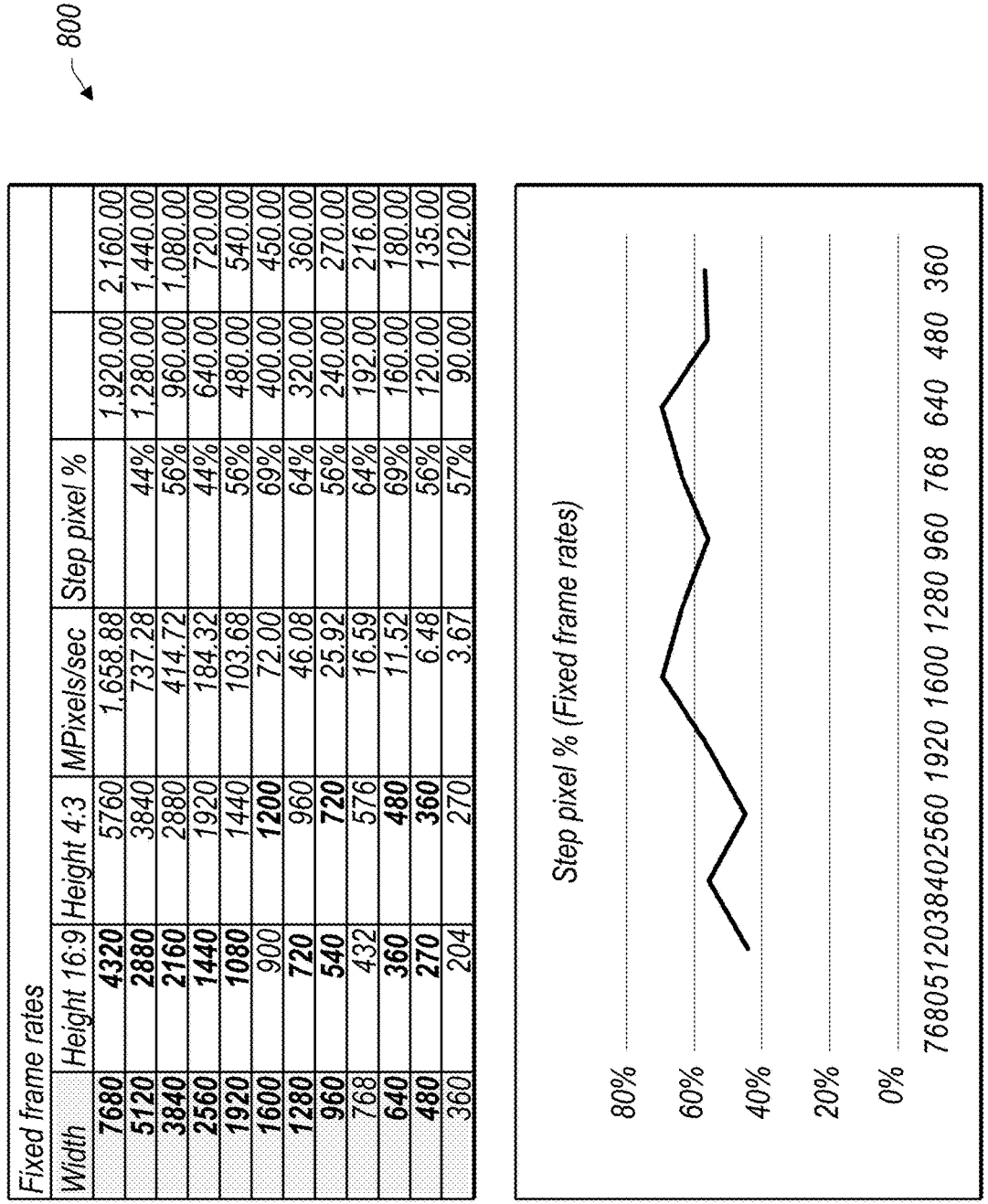
FIG. 8 is an internal resolution table template and step pixel percentages for fixed frame rates, according to some embodiments.

FIG. 8 is an internal resolution table template and step pixel percentages for fixed frame rates, according to some embodiments. FIG. 8 can be the resolution table template for single frame rate ABR ladder, in some embodiments. The table template 800 tries to keep the pixel step ratio (% between neighboring resolutions) between 56 to 69%, with the exception of going from UHD down to HD where there is a 44% pixel step ratio. The most common ABR resolutions are listed in bold in the table.

When generating the resolution table for an ABR ladder, the Automated ABR encoding system can first fill the top spot of the table with the top resolution provided by the user, in some embodiments. It can then fill in the rest of the table with the resolutions from the internal resolution table template, in some of these embodiments. The size of the generated resolution table can be 2 or 3 larger than the initial number of renditions, in some embodiments. To support any arbitrary aspect ratio, the internal resolution table template might only store the picture width, and not the picture height, in some embodiments. Based on the aspect ratio of the top resolution provided by the user, the Automated ABR system can generate a resolution table with an aspect ratio matching that of the top resolution, in some of these embodiments.

Multiple Frame Rate Support

Figure 9:
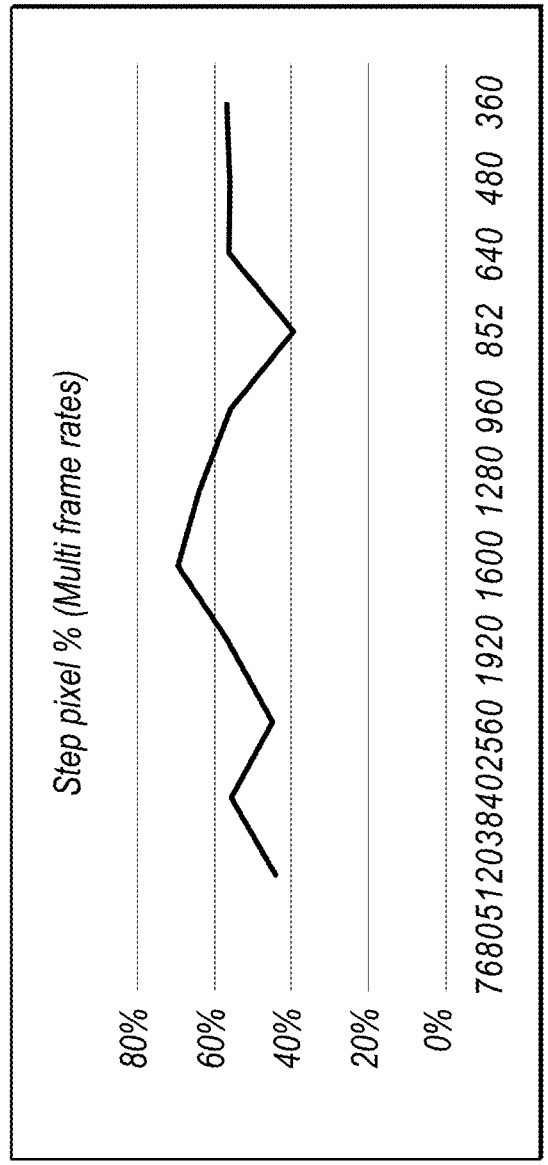
FIG. 9 is an internal resolution table template and step pixel percentages for multi frame rates, according to some embodiments.

FIG. 9 is an internal resolution table template and step pixel percentages for multi frame rates, according to some embodiments. For multiple frame rate in an ABR ladder, a new internal resolution table template 900 can be used, in some embodiments. In the new table template, the 768×432 resolution can be replaced with 852×480 to get a more even pixel step ratio, in some embodiments, since there is a steep 50% drop in frame rate after 960×540. An additional frame rate weighting can also be applied on top of the resolution weighting to take into account of the Quality Score ("QS") drop due to frame rate reduction, in some embodiments. A new set of weightings can be used in these embodiments, because a similar pixel count drop from frame rate reduction can have different impacts than from spatial resolution reduction:

$$QS_{ResFRWeighted1} = QS_{RESWeighted} \cdot \left(\frac{FR}{Full\ FR}\right)^{FRScaleExp}$$

$$QS_{ResFRWeighted2} = QS_{RESWeighted} - FROffsetExp \cdot \ln\left(\frac{FR}{Full\ FR}\right)$$

Split and Stitch Support

Figure 10:
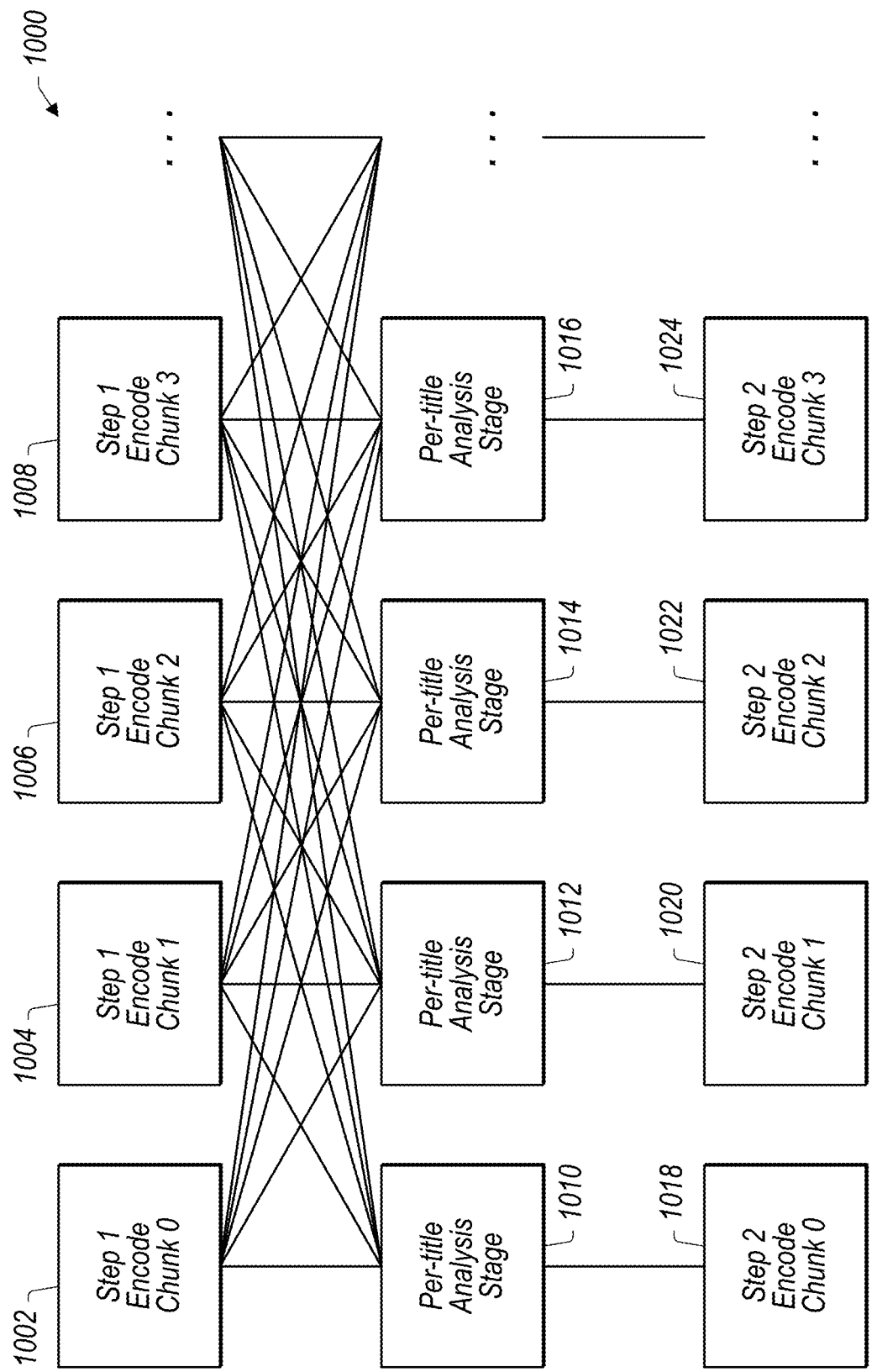
FIG. 10 is a flow diagram of an automated ABR encoding split-and-stitch control and stats data flow, according to some embodiments.

FIG. 10 is a flow diagram of an automated ABR encoding split-and-stitch control and stats data flow, according to some embodiments. One feature of Video-on-Demand ("VOD") encoding can be split-and-stitch support. To support split-and-stitch, the Automated ABR Encoding system can, at the Analysis stage 206 for example, process the stats from all (or at least some of) any step 1 encode chunks, in some embodiments. The paths to all the stats files can be sent in to the Analysis stage 206, in some embodiments. This can happen by way of an input file, in some of these embodiments. However, in some embodiments, in order for any chunk of the step 2 encode to start, the step 1 encode of all chunks should be complete. In addition, the per-title analysis stage to determine a common resolution/frame rate and quality level for all the chunks should also be complete, in some of these embodiments. The per-title analysis stage can be duplicated across all nodes, in some embodiments.

Infrastructure Usage

Figure 11:
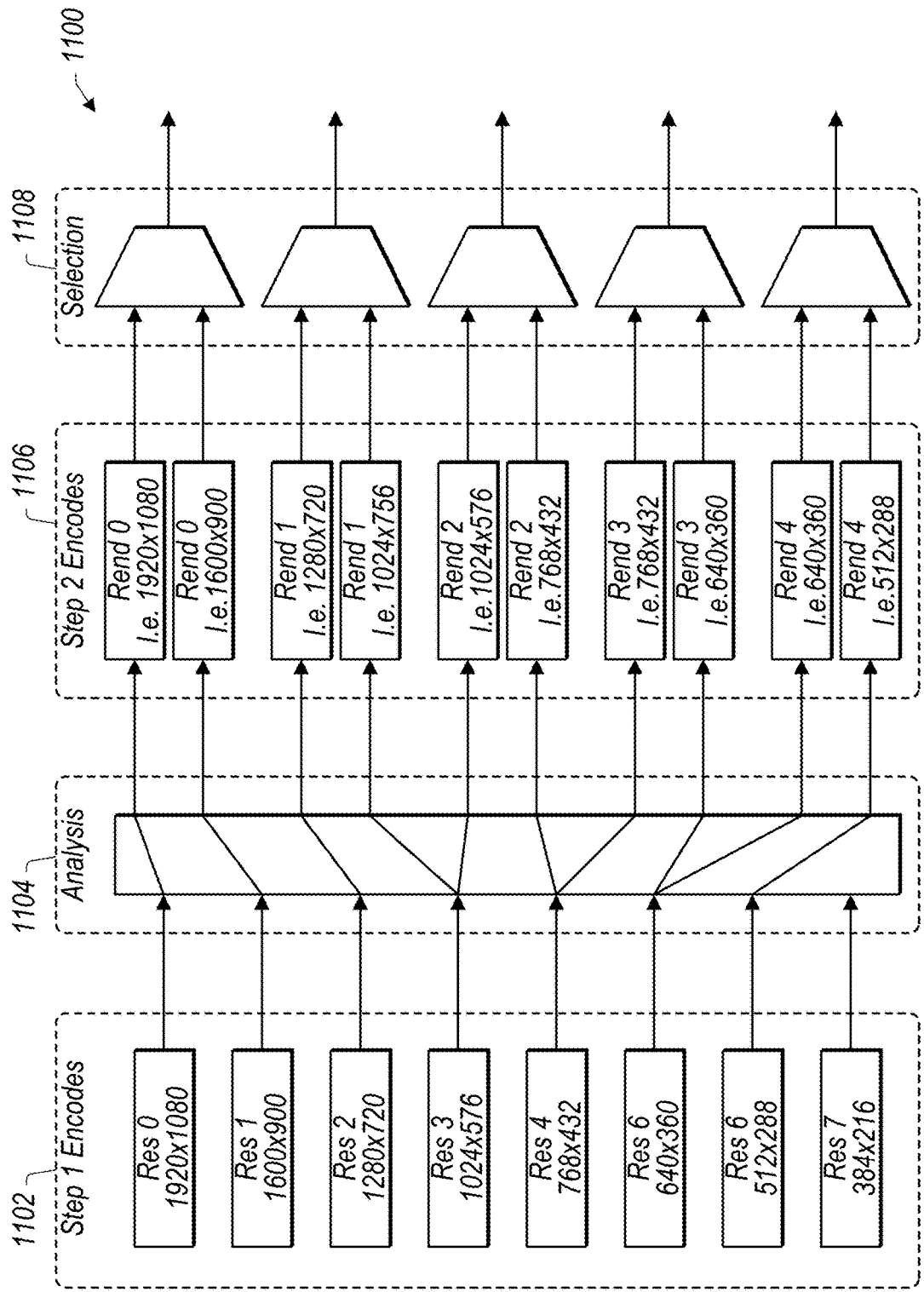
FIG. 11 is an automated ABR encoding infrastructure usage flow diagram, according to some embodiments.

FIG. 11 is an example automated ABR encoding infrastructure usage flow diagram, according to some embodiments. In some embodiments, the Automated ABR Encoding feature can be exposed as multi-pass, but underneath runs a single pass for each step of encodes. FIG. 11 shows 8 different step 1 encodes 1102. The analysis stage 1104 analyzes these step 1 encodes and determines that there should be 10 different step 2 encodes 1106. The step 2 encodes 1106 comprise 2 different encodes for each rendition: Rend 0, Rend 1, Rend 2, Rend 3, and Rend 4. The Selection stage 1108 selects one of these two encodes, for each rendition, for inclusion in the output ABR ladder, in the example shown in FIG. 11. As detailed elsewhere, in some embodiments, the second single pass encode operates on the statistics from the first encode, and the automated ABR encoding system has additional degrees of freedom in adjusting the resolution and encoding setting when compared to a traditional multi-pass encode. In the depicted example of FIG. 11 (which can be different with every job, and not just with a different embodiment), the total infrastructure usage for the depicted 5-rendition ABR job is approximately 1.8× that which would have been used to create a 5-rendition ABR job using a fixed ladder:

$$\text{Infrastructre Increase} = \frac{\text{Automated } ABR \text{ Infa.}}{\text{Fixed Ladder } Infra.} =$$

$$\frac{8(\text{step 1 single pass encodes}) + 10(\text{step 2 single pass encodes})}{5 \text{ multi pass encodes (with 2 passes)}} =$$

$$\frac{18 \text{ passes}}{10 \text{ passes}} = 1.8x$$

Other jobs or embodiments of the Automated ABR Encoding system can achieve different infrastructure usage by skipping and/or interpolating some resolutions in Step 1 encode, and/or reducing the number of Step 2 encodes. However, while potentially using a greater amount of infrastructure during the encoding, in some embodiments, the Automated ABR Encoding system provides a cost savings with overall package size and origin storage costs reduced by up to 40% when compared to a fixed ABR ladder, in some embodiments, in addition to the advantages of increasing efficiency, decreasing costs, increasing quality, and providing a simpler user experience.

Illustrative Methods of Transaction Processing at Edge Servers in a CDN

FIG. 12 is a flow diagram illustrating a method for generating a set of encoded video streams of an input video for ABR delivery, according to some embodiments. The flowchart begins at block 1210 by encoding an input video into an initial number of speculative encodings, based on determined resolution and quality level settings for the individual speculative encodings. The flowchart transitions to block 1220 that encodes the input video into output encodings using at least one different setting determined from respective quality scores estimated for the output encodings based on output statistics of the speculative encodings. The flowchart transitions to block 1230 which selects one or more output encodings from the output encodings to include in a set of encoded video streams for adaptive bit-rate (ABR) delivery.

FIG. 13 is a flow diagram illustrating a steps employed by an automated ABR encoding system to generate a set of encoded video streams of an input video for ABR delivery, according to some embodiments. The flowchart begins at block 1310 where an automated ABR encoding system receives information associated with an input video to ABR encode into a set of encoded video streams for ABR delivery. The flowchart transitions to block 1320 which determines an initial number of speculative encodings, and a resolution and a quality level setting for the speculative encodings. Next, block 1330 causes the input video to be encoded by video encoders into the speculative encodings to produce output statistics about the speculative encodings. Block 1340 determines, for individual renditions of the set of encoded video streams, resolution and quality level setting combinations, based on estimated quality scores for resolution and quality level setting combinations that were derived from an analysis of the output statistics. The flowchart transitions to block 1350 which causes, for individual renditions of the set of encoded video streams, the input video to be encoded, by the video encoders, into output video encodings based on the determined resolution and quality level setting combinations. Finally, the flowchart transitions to block 1360 which selects, for individual renditions of the set of encoded video streams, an output video encoding from the output video encodings to use as the individual rendition in the set of encoded video streams for ABR delivery.

Figure 14:
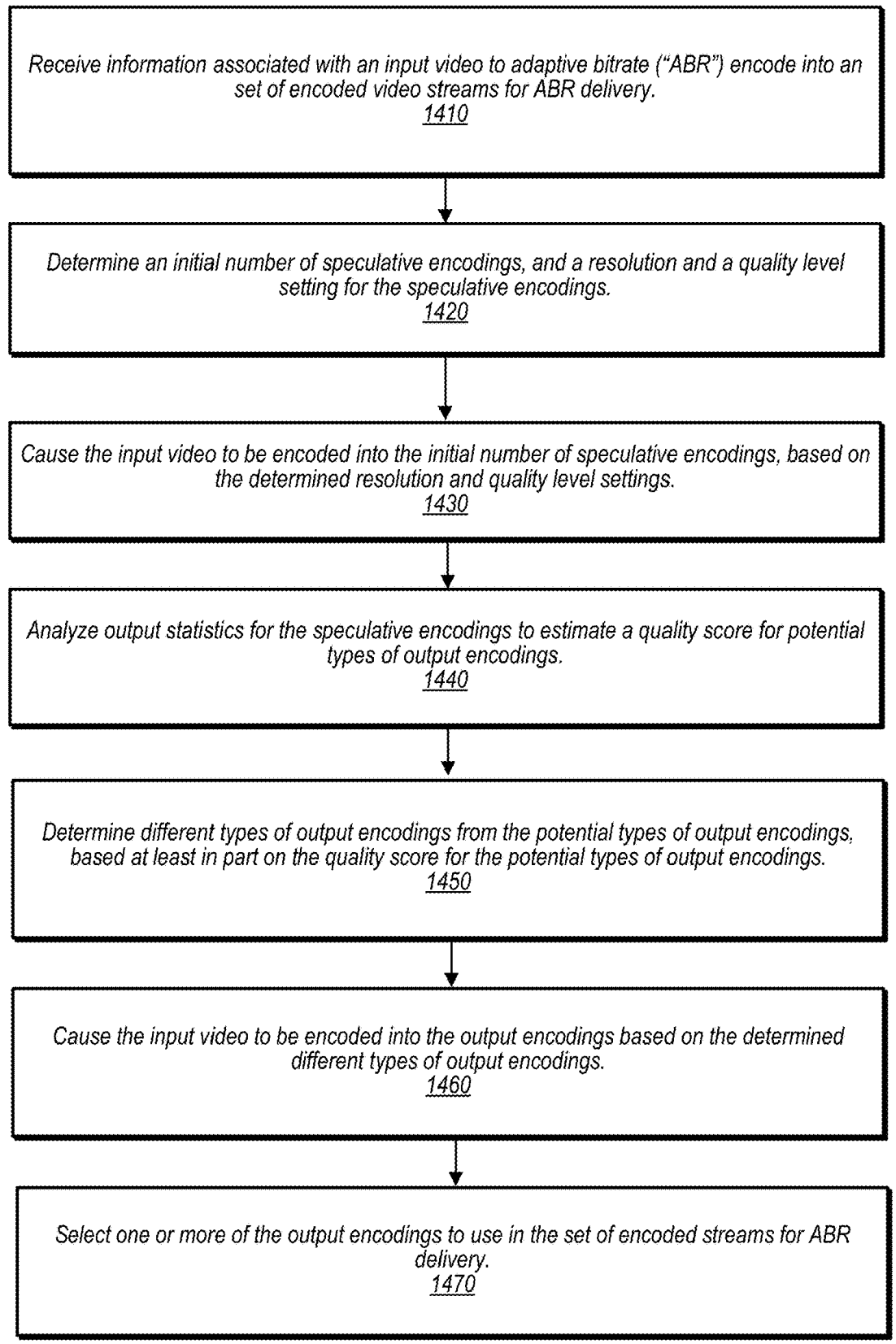
FIG. 14 is a flow diagram illustrating a further method for generating a set of encoded video streams of an input video for ABR delivery, according to some embodiments.

FIG. 14 is a flow diagram illustrating a further method for generating a set of encoded video streams of an input video for ABR delivery, according to some embodiments. The flowchart begins at block 1410 which receives information associated with an input video to adaptive bit-rate ("ABR") encode into an set of encoded video streams for ABR delivery. The flowchart transitions to block 1420 to determine an initial number of speculative encodings, and a resolution and a quality level setting for the speculative encodings. Next, block 1430 causes the input video to be encoded into the initial number of speculative encodings, based on the determined resolution and quality level settings. Block 1440 analyzes output statistics for the speculative encodings to estimate a quality score for potential types of output encodings. The flowchart transitions to block 1450 which determines different types of output encodings from the potential types of output encodings, based at least in part on the quality score for the potential types of output encodings. The flowchart transitions to block 1460 to cause the input video to be encoded into the output encodings based on the determined different types of output encodings. Finally, the flowchart transitions to block 1470 which selects one or more of the output encodings to use in the set of encoded streams for ABR delivery.

An Automated ABR Encoding System and Content Distribution Network in a Provider Network This section describes example provider network environments in which embodiments of an automated ABR encoding system interfacing with a content distribution network may be implemented. However, these example provider network environments are not intended to be limiting.

Figure 15:
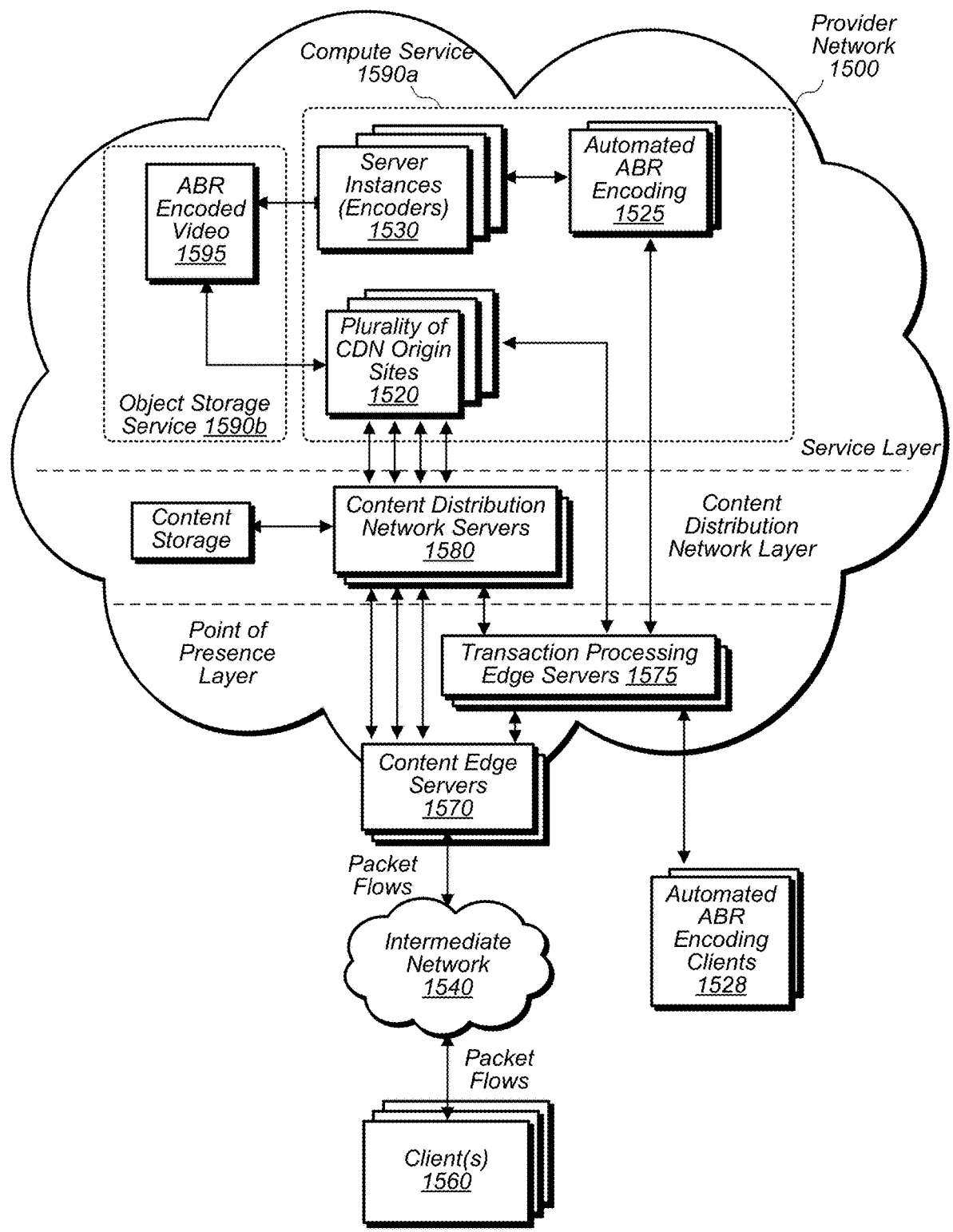
FIG. 15 illustrates an automated ABR encoding system interfacing with a content distribution network, an origin site, within the context of an example provider network environment, according to at least some embodiments.

FIG. 15 illustrates an automated ABR encoding system 1525 interfacing with a plurality of server instances configured as encoders 1530 that produce an ABR encoded video package 1595 that is used by a content distribution network 1580, and/or a plurality of origin sites 1520, within the context of an example provider network environment 1500, according to at least some embodiments.

This content distribution network layer might comprise additional layers of a content distribution network, besides the servers and storage of a point of presence, in some embodiments. In other embodiments, the content distribution network layer is not present, and the point of presence layer communicates directly with the service layer. FIG. 15 also illustrates a service layer comprising a plurality of origin sites 1520, where each origin site comprises a plurality of server instances and associated content storage, according to some embodiments. The service layer also comprises an automated ABR encoding system 1525 in an example provider network environment. FIG. 15 also illustrates external ABR encoding clients 1528 which do not comprise the provider network 1500, according to at least some embodiments. A provider network 1500 may provide resource virtualization to clients via one or more virtualization services that allow clients to access, purchase, rent, or otherwise obtain instances of virtualized resources, including but not limited to computation and storage resources, implemented on devices within the provider network or networks in one or more data centers.

Embodiments of a content distribution network are described that may be implemented on or by a provider network 1500, in some embodiments, that communicates with the plurality of clients 1560. In other embodiments a content distribution network may be implemented in enterprise networks or simple client-server networks, or any kind of network where a computer accesses a resource through a network. The content distribution network may be operated by an entity to provide one or more services, such as various types of content distribution services, accessible via the Internet and/or other networks to client(s) 1560. The content distribution network may include numerous data centers hosting various resource pools, such as collections of physical and/or virtualized computer servers 1580, storage devices, networking equipment and the like, needed to implement and distribute the infrastructure and services offered by the content distribution network. In some embodiments the content distribution network may employ computing resources for its provided services.

The client(s) 1560 may encompass any type of client configurable to submit requests to the content distribution network. For example, a given client 1560 may include a suitable version of a web browser or may include a plug-in module or other type of code module configured to execute as an extension to or within an execution environment provided by a web browser. Alternatively, a client 1560 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 1560 may be configured to generate network-based services requests according to a Representational State Transfer (REST)-style network-based services architecture, a document-based or message-based or network-based services architecture, or another suitable network-based services architecture. In some embodiments, the content distribution network may offer its services as web services, and the client(s) 1560 may invoke the web services via published interfaces for the web services. In some embodiments, a client 1560 (e.g., a computational client) may be configured to provide access to the content distribution network in a manner that is transparent to applications implemented on the client(s) 1560 utilizing content distribution resources provided by the content distribution network.

The client(s) 1560 may convey network-based services requests to the content distribution network via network connections, such as the intermediate network 1540, which, in some embodiments, can be the Internet. In various embodiments, network connections may encompass any suitable combination of networking hardware and protocols necessary to establish network-based communications between clients 1560 and the content distribution network. For example, a network connection may generally encompass the various telecommunications networks and service providers that collectively implement the Internet. A network connection may also include private networks such as local area networks (LANs) or wide area networks (WANs) as well as public or private wireless networks. For example, both a client 1560 and the content distribution network may be respectively provisioned within enterprises having their own internal networks. In such embodiments, the network connection may include the hardware (e.g., modems, routers, switches, load balancers, proxy servers, etc.) and software (e.g., protocol stacks, accounting software, firewall/security software, etc.) necessary to establish a networking link between the client 1560 and the Internet as well as between the Internet and the content distribution network. In some embodiments, client(s) 1560 may communicate with the content distribution network using a private network rather than the public Internet.

In the illustrated embodiment, clients 1560 may request electronic content from a merchant that owns the content located on the origin servers 1520 of the origin server site. The merchant might also own and/or operate the origin servers 1520 of the origin server site. The origin servers(s) 1520 may persistently store elements of content in content storage 111 and may also generate content dynamically, e.g., based on elements of content in the content storage. Examples of electronic content may include but are not limited to electronic representations of movies, music, and television programming. In one example, the merchant may sell or rent electronic content to clients through a commerce interface, such as a web portal configured to offer an electronic catalog of items as well as logic for accepting payment for items of such catalog.

A client 1560 can communicate with a merchant system to carry out carry out transactions for electronic content. Merchant system(s) may include systems configured to implement such a commerce interface. Clients 1560 may carry out transactions for electronic content with merchant system over one or more networks 1540 that are configured to transport electronic representations of data or information.

In various embodiments, the merchant system(s) may rely on the content distribution network for the actual delivery of content to client systems 1560. For instance, content distribution network may store electronic content that the merchant offers for sale to clients. The content sources may charge the merchant a fee for delivery of such content to the clients. The CDN may also provide various types of content such as web pages and their constituent elements, streaming media, downloadable media, application data, program code intended for execution at client devices, and so on.

Clients 1560 may be implemented by one or more computers or electronic devices configured to receive (e.g., download) and playback electronic content from the content distribution network. In various embodiments, clients 1560 may also include reporting logic configured to report quality metrics associated with content sources to merchant systems. For instance, when a given client system 1560 is engaged in a streaming content session with the content distribution network, the client system may record quality metrics associated with that session and send such metrics to merchant system(s). In various embodiments, different clients of clients 1560 may perform similar reporting actions. Merchant systems may store the metrics for multiple sessions within data store and use such metrics to generate rankings of content sources. A given ranking may rank content sources based on an expected measure of quality for a content stream between one of the content sources and one of the clients. In various embodiments, the merchant system (s) may generate a given ranking such that the cost of content delivery (e.g., the cost that content sources charge the merchant for delivering content to the clients) influences the rank of content sources.

In the illustrated embodiment, the content distribution network may be implemented by one or more points of presence that include content edge servers 1570 that are configured to provide (e.g., stream or transfer) data to clients 1560. The points of presence may also cache elements of content originally obtained from the origin server(s) 1520. Accordingly, each of the points of presence or content edge servers 1570, may include a content cache. In various embodiments, a given CDN may include one or more servers, routers, caches, and other components in order to provide content to multiple geographically-dispersed clients. In various embodiments, any given component of the content distribution network may be implemented on one or more computers, such as that of FIG. 16 described below.

In some embodiments, private IP addresses may be associated with the resource instances; the private IP addresses are the internal network addresses of the resource instances on the provider network 1500. In some embodiments, the provider network 1500 may also provide public IP addresses and/or public IP address ranges (e.g., Internet Protocol version 4 (IPv4) or Internet Protocol version 6 (IPv6) addresses) that clients may obtain from the provider 1500.

Conventionally, the provider network 1500, via the virtualization services, may allow a client of the service provider (e.g., a client that operates clients 1560) to dynamically associate at least some public IP addresses assigned or allocated to the client with particular resource instances assigned to the client. The provider network 1500 may also allow the client to remap a public IP address, previously mapped to one virtualized computing resource instance allocated to the client, to another virtualized computing resource instance that is also allocated to the client. Using the virtualized computing resource instances and public IP addresses provided by the service provider, a client of the service provider such as the operator of clients 1560 may, for example, implement client-specific applications and present the client's applications on an intermediate network 1540, such as the Internet. Either the clients 1560 or other network entities on the intermediate network 1540 may then generate traffic to a destination domain name published by the clients 1560. First, either the clients 1560 or the other network entities make a request to the content edge servers 1570 for content in the content storage of an origin site 1520, where the origin site is implemented by a plurality of compute instances.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance. Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all resource instance types.

At least some public IP addresses may be allocated to or obtained by clients of the provider network 1500; a client may then assign their allocated public IP addresses to particular resource instances allocated to the client. These public IP addresses may be referred to as client public IP addresses, or simply client IP addresses. Instead of being assigned by the provider network 1500 to resource instances as in the case of standard IP addresses, client IP addresses may be assigned to resource instances by the clients, for example via an API provided by the service provider. Unlike standard IP addresses, client IP addresses are allocated to client accounts and can be remapped to other resource instances by the respective clients as necessary or desired. A client IP address is associated with a client's account, not a particular resource instance, and the client controls that IP address until the client chooses to release it. A client IP address can be an Elastic IP address. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

A provider network 1500 may provide a compute service 1590*a* implemented by physical server nodes to clients 1560, which includes a plurality of compute instances 1520, 1525, or 1530. The compute service also contains many other server instances for many other clients and other customers of the provider network 1500. Each of the plurality of origin sites 1520 might comprise its own set of server instances and content storage, for example. As another example, the provider network provides a virtualized data storage service or object storage service 1590*b* which can include a plurality of data storage instances implemented by physical data storage nodes. The data storage service or object storage service 5190*b* can store files for the client, which are accessed by the appropriate server instance of the client. As another example, the provider network might provide a virtualized database service implemented by database nodes, which includes at least one database instance for a client. A server instance pertaining to the client in the compute service can access a database instance pertaining to the client when needed. The database service and data storage service also contain multiple files or database instances that pertain to other clients and other customers of the provider network 1500. The provider network can also include multiple other client services that pertain to one or more customers. The clients 560 may access any one of the client services 1590*a*, 1590*b*, or the database service, for example, via an interface, such as one or more APIs to the service, to obtain usage of resources (e.g., data storage instances, or files, or database instances, or server instances) implemented on multiple nodes for the service in a production network portion of the provider network 1500.

Communication from the clients to an instance of a service can be routed to the appropriate instance by the content distribution network 1580. Server nodes in the compute service 1590a may each implement a server, for example a web server or application server or a cloud-based browser that might comprise an origin site. One or more content distribution network servers 1580 may be implemented in a network connection manager layer between the border network and the production network. The transaction processing edge server 1575 can communicate with either internal transaction entities 1525, that can be implemented by the compute service 1590a, or with external automated ABR encoding clients 1528, in order to execute a data transaction with the appropriate transaction entities. Content edge server(s) 1570 may receive packets (e.g., TCP packets) in packet flows from clients 1560 via an intermediate network 1540 such as the Internet, and forward the packets to the appropriate content distribution network server 1580, or the appropriate server node or instance 1520 of the origin site 1110. Or it might forward the packets containing a public IP address to an apparatus that can map the public IP address to a private IP address. The packets may be targeted at the public IP address(es) included in responses to requests. The content distribution network servers 1580 may use the procedures described herein to determine target server nodes or compute instances in the plurality of server instances 1520 for the packet flows, and to facilitate traffic between the compute instances and the clients 1560.

Illustrative System

Figure 16:
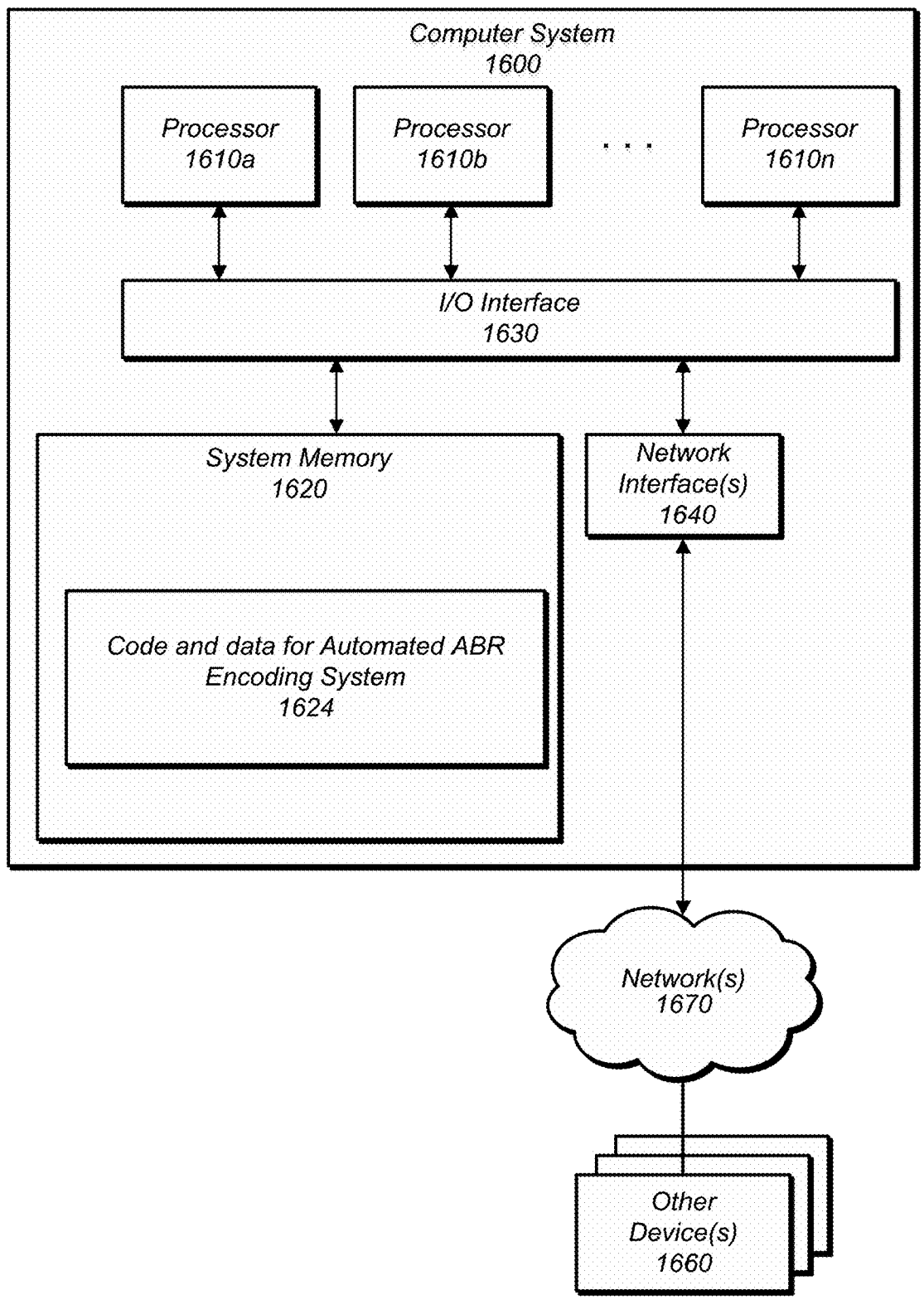
FIG. 16 is a block diagram illustrating an example computer system that may be used for an automated ABR encoding system, according to some embodiments.

FIG. 16 is a block diagram illustrating an example computer system that may be used for an Automated ABR encoding system, according to some embodiments. In at least some embodiments, a computer that implements a portion or all of the methods and apparatus for an Automated ABR encoding system as described herein may include a general-purpose computer system or computing device that includes or is configured to access one or more computer-accessible media, such as computer system 1600 illustrated in FIG. 16. FIG. 16 is a block diagram illustrating an example computer system that may be used in some embodiments. This computer system can be used as a network connection manager, for example, or as a backend resource host which executes one or more of backend resource instances, or one or more of the plurality of compute instances 1530 in the compute service 1590a. In the illustrated embodiment, computer system 1600 includes one or more processors 1610 coupled to a system memory 1620 via an input/output (I/O) interface 1630. Computer system 1600 further includes a network interface 1640 coupled to I/O interface 1630.

In various embodiments, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA.

System memory 1620 may be configured to store instructions and data accessible by processor(s) 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for an apparatus and method of an Automated ABR encoding system, are shown stored within system memory 1620 as the code and data for an Automated ABR encoding system 1624.

In one embodiment, I/O interface 1630 may be configured to coordinate I/O traffic between processor 1610, system memory 1620, and any peripheral devices in the device, including network interface 1640 or other peripheral interfaces. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices 1660 attached to a network or networks 1670, such as other computer systems or devices as illustrated in FIGS. 1 and 15, for example. In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks such as Fibre Channel SANs, or via any other suitable type of network and/or protocol.

In some embodiments, system memory 1620 may be one embodiment of a computer-accessible medium configured to store program instructions and data as described above for FIGS. 1 through 15 for implementing an Automated ABR encoding system. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1600 via I/O interface 1630. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1600 as system memory 1620 or another type of memory. Further, a computer-accessible medium may include transmission media or signals such as electrical, electromagnetic, or digital signals, conveyed via a communication medium such as a network and/or a wireless link, such as may be implemented via network interface 1640.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices, comprising one or more processors and a memory, configured to implement a plurality of video encoders configured to encode an input video using adaptive bitrate ("ABR") encoding;
one or more computing devices, comprising one or more processors and a memory, configured to implement an automated ABR encoding system, configured to:
receive information associated with an input video to ABR encode into a set of encoded video streams for ABR delivery, wherein a rendition comprises a member of the set of encoded video streams, and wherein different renditions comprise ABR encodings of the video at different respective bit-rates;
determine an initial number of speculative encodings, and a resolution and a quality level setting for individual ones of the speculative encodings;
cause the input video to be encoded by the plurality of video encoders into the speculative encodings to produce output statistics for the individual speculative encodings;
determine, for individual renditions, one or more different resolution and quality level setting combinations, based at least in part on estimated quality scores for a plurality of resolution and quality level setting combinations that were derived from an analysis of the output statistics;
cause, for individual renditions, the input video to be encoded, by the plurality of video encoders, into one or more output video encodings based at least in part on the one or more determined different resolution and quality level setting combinations;
estimate for the one or more output encodings, a plurality of output bit-rates according to the one or more different resolution and quality level setting combinations; and
select, for individual renditions, an output video encoding from the one or more output video encodings to use as the individual rendition in the set of encoded video streams for ABR delivery based at least in part on the estimated output bit-rates.

2. The system of claim 1 wherein prior to determining the initial number of speculative encodings, the automated ABR encoding system is further configured to:
determine an initial number of renditions for the set of encoded video streams;
wherein the initial number of speculative encodings is at least the initial number of renditions for the set of encoded video streams.

3. The system of claim 2, wherein the automated ABR encoding system is further configured to:
determine a target bit-rate for each of the renditions in the determined initial number of renditions for the set of encoded video streams;
wherein the estimated quality scores for the plurality of resolution and quality level setting combinations further comprises:
estimated quality scores and output bit-rates for individual ones of the plurality of resolution and quality level setting combinations.

4. The system of claim 3, wherein to determine, for the individual renditions, the one or more different resolution and quality level setting combinations, the automated ABR encoding system is further configured to, for each individual rendition:
compare the estimated output bit-rates for individual ones of the plurality of resolution and quality level setting combinations to the determined target bit-rate for the individual rendition; and
based at least in part on the comparisons and on the estimated quality scores for the plurality of resolution and quality level setting combinations, determine the one or more different resolution and quality level setting combinations for the individual rendition.

5. The system of claim 1 wherein to determine the initial number of speculative encodings, the automated ABR encoding system is further configured to:
determine resolution candidates of the input video to use for the set of encoded video streams for ABR delivery; and
determine at least one speculative encoding for each of the resolution candidates of the input video.

6. A method comprising:
generating a set of encoded video streams of an input video for adaptive bitrate (ABR) delivery, comprising:
encoding the input video into an initial number of speculative encodings, based at least in part on a respectively determined resolution and quality level setting for individual ones of the speculative encodings;
encoding the input video into a plurality of output encodings using at least one different setting determined from respective quality scores estimated for the plurality of output encodings based at least in part on respective output statistics of the speculative encodings;
estimating for the plurality of output encodings, a plurality of output bit-rates according to different combinations of potential resolution and quality level; and
selecting one or more output encodings from the plurality of output encodings to include in the set of encoded video streams based at least in part on the estimated output bit-rates.

7. The method of claim 6, wherein prior to the encoding the input video into an initial number of speculative encodings, the method further comprises:
determining an initial number of renditions for the set of encoded video streams, wherein a rendition comprises a member of the set of encoded video streams for ABR delivery; and
determining the initial number of speculative encodings;

wherein the initial number of speculative encodings comprises at least the initial number of renditions for the set of encoded video streams.

8. The method of claim 7, further comprising:
determining a target bit-rate for each of the renditions in the determined initial number of renditions for the set of encoded video streams;
wherein prior to the encoding the input video into the plurality of output encodings using the at least one different setting, the method further comprises:
analyzing output statistics for individual ones of the speculative encodings to estimate respective quality scores and output bit-rates for a plurality of potential resolution and quality level setting combinations of the output encodings.

9. The method of claim 8, wherein subsequent to the estimating the respective quality scores and output bit-rates for the plurality of potential resolution and quality level setting combinations of the output encodings, the method further comprises, for individual renditions in the determined initial number of renditions for the set of encoded video streams:
comparing the estimated output bit-rates for individual ones of the plurality of potential resolution and quality level setting combinations to the determined target bit-rate for the individual rendition; and
based at least in part on the comparisons and on the estimated quality scores for the plurality of potential resolution and quality level setting combinations, determining one or more different resolution and quality level setting combinations for the individual rendition.

10. The method of claim 9, wherein the determining the one or more different resolution and quality level setting combinations for the individual rendition further comprises:
perform a 2D search of plurality of potential resolution and quality level setting combinations, in order to maximize the estimated quality scores of the one or more different resolution and quality level setting combinations, and to minimize the difference between the estimated output bit-rate of the one or more different resolution and quality level setting combinations and the determined target bit-rate for the individual rendition.

11. The method of claim 7, further comprising:
obtaining a minimum and maximum resolution, and a minimum and maximum bit-rate, for the set of encoded video streams for ABR delivery;
wherein the determining the initial number of renditions for the set of encoded video streams further comprises:
obtaining the maximum step ratio threshold for the resolution for the set of encoded video streams, for the bit-rate for the set of encoded video streams, or for both, wherein the step ratio is the ratio between an adjacent lower rendition in the set of encoded video streams and a current rendition; and
determining the maximum number of renditions wherein, for each rendition, the step ratio for the resolution, for the bit-rate, or for both, is less than the corresponding maximum step ratio threshold; and
providing the determined maximum number of renditions as the determined initial number of renditions for the set of encoded video streams.

12. The method of claim 7, wherein the determining the initial number of speculative encodings further comprises:
determining resolution candidates of the input video to use for the set of encoded video streams for ABR delivery; and
determining at least one speculative encoding of the initial number of speculative encodings for each of the resolution candidates of the input video.

13. The method of claim 7, wherein the determining the initial number of speculative encodings further comprises:
determining a respective maximum bit rate and a buffer size, in addition to the respective resolution and the quality level setting, for the individual ones of the speculative encodings;
wherein the encoding the input video into the initial number of speculative encodings further comprises:
encoding the input video into the initial number of speculative encodings, based at least in part on the respectively determined maximum bit-rate and buffer size, in addition to the respectively determined resolution and quality level setting.

14. The method of claim 6, wherein the encoding the input video into the plurality of output encodings using the at least one different setting determined from the respective quality scores estimated for the plurality of output encodings further comprises:
determining two superior resolution and quality level setting combinations for each member of the set of encoded video streams for ABR delivery, wherein the determining is based at least in part on estimated quality scores and estimated bit-rates for different potential resolution and quality level setting combinations of the output encodings; and
encoding, for each member of the set of encoded video streams for ABR delivery, the input video into two output encodings with the respective two different resolution and quality level setting combinations;
wherein the selecting the one or more output encodings from the plurality of output encodings to include in the set of encoded video streams for ABR delivery further comprises:
selecting, for each member of the set of encoded video streams for ABR delivery, one of the two output encodings with the respective two different resolution and quality level setting combinations to use in the set of encoded video streams for ABR delivery, based at least in part on a quality score of the two output encodings and a determined bit-rate of the two output encodings.

15. One or more non-transitory computer-readable storage media storing program instructions, that when executed on or across one or more processors of an automated adaptive bitrate ("ABR") encoding system, cause the one or more processors to:
receive information associated with an input video to adaptive bitrate ("ABR") encode into a set of encoded video streams for ABR delivery;
determine an initial number of speculative encodings, and a resolution and a quality level setting for individual ones of the speculative encodings;
cause the input video to be encoded into the initial number of speculative encodings, based at least in part on the determined resolution and quality level settings;
analyze output statistics for the individual speculative encodings to estimate a quality score for a plurality of potential types of output encodings;
determine a plurality of different types of output encodings from the plurality of potential types of output encodings, based at least in part on the quality score for the plurality of potential types of output encodings;

cause the input video to be encoded into a plurality of output encodings based at least in part on the determined plurality of different types of output encodings;

estimate for the one or more output encodings, a plurality of output bit-rates according to the one or more different resolution and quality level setting combinations; and select one or more output encodings from the plurality of output encodings to use in the set of encoded streams for ABR delivery based at least in part on the estimated output bit-rates.

16. The one or more non-transitory computer-readable storage media of claim 15, wherein prior to the determining the initial number of speculative encodings, the program instructions cause the automated ABR encoding system to further perform:

determine an initial number of renditions for the set of encoded video streams, wherein a rendition comprises a member of the set of encoded video streams; and wherein the initial number of speculative encodings comprises at least the initial number of renditions for the set of encoded video streams.

17. The one or more non-transitory computer-readable storage media of claim 16, wherein the program instructions cause the automated ABR encoding system to further perform:

determine a target bit-rate for each of the renditions in the determined initial number of renditions for the set of encoded video streams;

wherein to estimate respective quality scores for the plurality of potential types of output encodings, the method further comprises:

estimate respective quality scores and output bit-rates for a plurality of potential resolution and quality level setting combinations of the output encodings.

18. The one or more non-transitory computer-readable storage media of claim 17, wherein to determine the plurality of different types of output encodings, the program instructions cause the automated ABR encoding system to further perform, for individual renditions in the determined initial number of renditions for the set of encoded video streams:

compare the estimated output bit-rates for individual ones of the plurality of potential resolution and quality level setting combinations to the determined target bit-rate for the individual rendition; and based at least in part on the comparisons and on the estimated quality scores for the plurality of potential resolution and quality level setting combinations, determine one or more different resolution and quality level setting combinations for the individual rendition.

19. The one or more non-transitory computer-readable storage media of claim 18, wherein to determine the one or more different resolution and quality level setting combinations for the individual rendition, the program instructions cause the automated ABR encoding system to further perform:

perform a 2D search of plurality of potential resolution and quality level setting combinations, in order to maximize the estimated quality scores of the one or more different resolution and quality level setting combinations, and to minimize the difference between the estimated output bit-rate of the one or more different resolution and quality level setting combinations and the determined target bit-rate for the individual rendition.

20. The one or more non-transitory computer-readable storage media of claim 16, wherein the program instructions cause the automated ABR encoding system to further perform:

obtain a minimum and maximum resolution, and a minimum and maximum bit-rate, for the set of encoded video streams for ABR delivery;

wherein to determine the initial number of renditions for the set of encoded video streams, the program instructions cause the automated ABR encoding system to further perform:

obtain the maximum step ratio threshold for the resolution, for the bit-rate, or for both, wherein the step ratio is the ratio between the adjacent lower rendition in the set of encoded video streams and the current rendition; and determine the maximum number renditions wherein, for each rendition, the step ratio for the resolution, for the bit-rate, or for both, is less than the corresponding maximum step ratio threshold; and provide the determined maximum number of renditions as the determined initial number of renditions for the set of encoded video streams.

\* \* \* \* \*